US006906322B2

(12) United States Patent
Berggren et al.

(10) Patent No.: US 6,906,322 B2
(45) Date of Patent: Jun. 14, 2005

(54) CHARGED PARTICLE SOURCE WITH DROPLET CONTROL FOR MASS SPECTROMETRY

(75) Inventors: William Travis Berggren, Madison, WI (US); Michael Scott Westphall, Fitchburg, WI (US); Lloyd Michael Smith, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 10/113,897

(22) Filed: Mar. 29, 2002

(65) Prior Publication Data

US 2002/0166961 A1 Nov. 14, 2002

Related U.S. Application Data

(60) Provisional application No. 60/280,632, filed on Mar. 29, 2001.

(51) Int. Cl.[7] .......................... B01D 59/44; H01J 49/00

(52) U.S. Cl. ....................... 250/288; 250/281; 250/282; 250/283

(58) Field of Search ................................ 250/288, 283, 250/282, 281, 287, 396 R, 294

(56) References Cited

U.S. PATENT DOCUMENTS

| | | | | |
|---|---|---|---|---|
| 3,683,212 A | | 8/1972 | Zoltan | 310/8.3 |
| 3,857,049 A | | 12/1974 | Zoltan | 310/8.1 |
| 4,352,570 A | | 10/1982 | Firth | 366/127 |
| 4,383,171 A | * | 5/1983 | Sinha et al. | 250/282 |
| 4,461,155 A | | 7/1984 | Werjefelt | 62/93 |
| 4,492,322 A | | 1/1985 | Hieftje et al. | 222/420 |
| 4,546,253 A | | 10/1985 | Tsuchiya et al. | 250/288 |
| 4,579,279 A | | 4/1986 | Marchant | 239/3 |
| 4,580,148 A | | 4/1986 | Domoto et al. | 347/63 |
| 4,735,364 A | | 4/1988 | Marchant | 239/690.1 |

(Continued)

FOREIGN PATENT DOCUMENTS

| | | | |
|---|---|---|---|
| WO | WO 00/17908 | 3/2000 | H01J/49/04 |

OTHER PUBLICATIONS

"Nonclassical Radiation of a Single Stored Ion", Diedrich et al, Physical Rev., vol. 58, No. 3, Jan. 1987, pp. 203–206.*

Allison, E.E. and Kendall, B.R.F. (Nov. 1996), "Cubic electrodynamic levitation trap with transparent electrodes," *Rev. Sci. Instrum.* 67(11):3806–3812.

(Continued)

*Primary Examiner*—John R. Lee
*Assistant Examiner*—Kalimah Fernandez
(74) *Attorney, Agent, or Firm*—Greenlee, Winner and Sullivan, P.C.

(57) ABSTRACT

The invention provides devices, device configurations and methods for improved sensitivity, detection level and efficiency in mass spectrometry particularly as applied to biological molecules, including biological polymers, such as proteins and nucleic acids. In one aspect, the invention relates to charged droplet sources and their use as ion sources and as components in ion sources. In another aspect, the invention relates to charged droplet traps and their use as ion sources and as elements of ion sources. Further, the invention relates to the use of aerodynamic lenses for high efficiency ion transport to a charge particle analyzer, particularly a mass analyzer. Devices of this invention allow mass spectral analysis of a single charged droplet. The ion sources of this invention can be combined with any charge particle detector or mass analyzer, but are a particularly benefit when used in combination with a time of flight mass spectrometer.

104 Claims, 7 Drawing Sheets

U.S. PATENT DOCUMENTS

| | | | | | |
|---|---|---|---|---|---|
| 4,761,545 | A | * | 8/1988 | Marshall et al. | 250/291 |
| 4,762,995 | A | * | 8/1988 | Browner et al. | 250/282 |
| 4,845,512 | A | | 7/1989 | Arway | 347/77 |
| 4,883,958 | A | * | 11/1989 | Vestal | 250/288 |
| 4,924,097 | A | | 5/1990 | Browner et al. | 250/343 |
| 4,935,624 | A | | 6/1990 | Henion et al. | 250/288 |
| 5,073,713 | A | | 12/1991 | Smith et al. | 250/282 |
| 5,076,097 | A | | 12/1991 | Zarrin et al. | 73/61.1 |
| 5,192,865 | A | | 3/1993 | Zhu | 250/288 |
| 5,247,842 | A | * | 9/1993 | Kaufman et al. | 73/865.5 |
| RE34,757 | E | | 10/1994 | Smith et al. | 204/452 |
| 5,359,196 | A | * | 10/1994 | Whitt | 250/288 |
| 5,403,617 | A | | 4/1995 | Haaland | 427/180 |
| 5,448,062 | A | * | 9/1995 | Cooks et al. | 250/288 |
| 5,504,327 | A | | 4/1996 | Sproch et al. | 250/288 |
| 5,560,543 | A | | 10/1996 | Smith et al. | 239/102.2 |
| 5,565,677 | A | * | 10/1996 | Wexler et al. | 250/251 |
| 5,608,217 | A | * | 3/1997 | Franzen et al. | 250/288 |
| 5,611,846 | A | | 3/1997 | Overton et al. | 96/102 |
| 5,614,711 | A | | 3/1997 | Li et al. | 250/287 |
| 5,750,988 | A | | 5/1998 | Apffel et al. | 250/288 |
| 5,767,512 | A | * | 6/1998 | Eiden et al. | 250/282 |
| 5,838,002 | A | | 11/1998 | Sheehan | 250/288 |
| 5,873,523 | A | | 2/1999 | Gomez et al. | 239/3 |
| 5,894,841 | A | | 4/1999 | Voges | 128/203.12 |
| 5,922,976 | A | | 7/1999 | Russell et al. | 73/865.5 |
| 5,925,732 | A | | 7/1999 | Ecker et al. | 530/334 |
| 5,945,678 | A | | 8/1999 | Yanagisawa | 250/423 |
| 5,965,883 | A | | 10/1999 | Lee et al. | 250/288 |
| 5,973,904 | A | | 10/1999 | Pui et al. | 361/225 |
| 5,992,244 | A | | 11/1999 | Pui et al. | 73/865.5 |
| 6,001,309 | A | | 12/1999 | Gamble et al. | 422/100 |
| 6,027,699 | A | | 2/2000 | Holcomb et al. | 422/186.04 |
| 6,051,189 | A | | 4/2000 | Wick et al. | 422/82.01 |
| 6,093,557 | A | | 7/2000 | Pui et al. | 435/173.1 |
| 6,107,628 | A | * | 8/2000 | Smith et al. | 250/292 |
| 6,207,954 | B1 | | 3/2001 | Andrien et al. | 250/288 |
| 6,277,334 | B1 | | 8/2001 | Ecker et al. | 422/131 |
| 6,278,111 | B1 | | 8/2001 | Sheehan et al. | 250/288 |
| 6,331,702 | B1 | * | 12/2001 | Krutchinsky et al. | 250/281 |
| 6,359,275 | B1 | | 3/2002 | Bertsch et al. | 250/281 |
| 6,396,057 | B1 | * | 5/2002 | Jarrell et al. | 250/288 |
| 6,469,295 | B1 | * | 10/2002 | Park | 250/282 |
| 6,593,570 | B2 | * | 7/2003 | Li et al. | 250/290 |
| 2001/0028866 | A1 | | 10/2001 | Ecker et al. | 422/131 |
| 2001/0030285 | A1 | | 10/2001 | Miller et al. | 250/288 |
| 2001/0035494 | A1 | | 11/2001 | Scalf et al. | 250/288 |
| 2002/0011562 | A1 | | 1/2002 | Park | 250/288 |
| 2002/0125423 | A1 | | 9/2002 | Ebeling et al. | 250/288 |
| 2002/0158196 | A1 | | 10/2002 | Berggren et al. | 250/288 |

OTHER PUBLICATIONS

Chen, D.R. et al. (1995), "Electrospraying of conducting liquids for monodisperse aerosol generation in the 4 nm to 1.8 $\mu$m diameter range," *J. Aerosol. Sci.* 26:963–977.

Cheng, X. et al. (Feb. 1995), "Charge state reduction of oligonucleotide negative ions from electrospray ionization," *Anal. Chem.* 67(3):586–593.

Cooper, D.W. and Reist, P.C. (Oct. 1973), "Neutralizing charged aerosols with radioactive sources," *J. Colloid and Interface Sci.* 45:17–26.

Dahneke, B. and Flachsbart, H. (1972), "An aerosol beam spectrometer," *Aerosol Sci.* 3:345–349.

Feng, X. and Agnes, G.R. (May 2000), "Single isolated droplets with net charge as a source of ions," *Amer. Soc. Mass Spec.* 11:393–399.

Fenn, J.B. et al. (Oct. 1989), "Electrospray ionization for mass spectronletry of large biomolecules," *Science* 246:64–71.

Fenn, J.B. et al. (1990), "Electrospray ionization—principles and practice," *Mass. Spec. Rev.* 9:37–70.

Galley, P.J. and Hieftje, G.M. (1992), "Technique for producing capillaries with reproducible orifice diameters for uniform droplet generation," *Applied Spectroscopy* 46(10):1460–1463.

Georghiou, G.E. et al. (1999), "Characterization of point–plane corona in air at radio frequency using a FE–FCT method," *J. Phys. D: Appl. Phys.* 32:2204–2218.

Griffey, RH. et al. (1997), "Oligonucleotide charge states in negative ionization Electrospray–mass spectrometry are a function of solution ammonium ion concentration," *J. Am. Soc. Mass Spectrometry* 8:155–160.

Hager, D.B. et al. (Nov. 1994), "Droplet electrospray mass spectrometry,"*Anal. Chem.* 66(22):3944–3949.

He, L. and Murray, K. (1999), "337 nm Matrix–assisted Laser Desorption/Ionization of Single Aerosol Particles," *J. Mass Spectrom.*, 34:909–914.

Huang, E.C. et al. (Jul. 1990), "Atmospheric pressure ionization mass spectrometry," *Anal. Chem.* 62(13):713A–725A.

Karas et al., (1988), "Laser desorption ionization of proteins with molecular masses exceeding 10,000 daltons," *Anal. Chem.* 60:2299–2306.

Karas et al. (1987), "Matrix–assisted ultraviolet laser desorprion of non–volatile compounds," *Int. J. Mass Spectrometry, Ion Proc.*, 78:53–68.

Kaufman, S.L. et al. (Jun. 1996), "Macromolecule analysis based on electrophoretic mobility in air: globular proteins," *Anal. Chem.* 68:1895–1904.

Kaufman, S.L. et al. (Jun. 1996), "Macromolecule analysis based on electrophoretic mobility in air: globular proteins," *Anal. Chem.* 68:3703.

Kaufman, S.L. (1997), "TSI working prototype GEMMA* macromolecule analyzer," *TSI IncorporatedAdvanced Technology Group.*

Kaufman, S.L. (1998), "Analysis of biomolecules using electrospray and nanoparticle methods: the gas–phase electrophoretic mobility molecular analyzer (GEMMA)," *J. Aerosol. Sci.* 29(5,6):537–552.

Kaufman, S.L. et al. (1998), "Analysis of a 3.6–MDa hexagonal bilayer hemoglobin from *Lumbricus terrestris* using a gas–phase electrophoretic mobility molecular analyzer," *Anal. Biochem.* 259:195–202.

Kaufman, S.L. (Feb. 2000), "Electrospray diagnostics performed by using sucrose and proteins in the gas–phase electrophoretic mobility molecular analyzer (GEMMA)," *Anal. Chim. Acta* 406:3–10.

Kim, T. et al. (May 2000), "Design and implementation of a new electrodynamic ion funnel," *Anal. Chem.* 72(10):2247–2255.

Kim, T. et al. (Oct. 2000), "Improved ion transmission from atmospheric pressure to high vacuum using a multicapillary inlet and electrodynamic ion funnel interface,"*Anal. Chem.* 72(20):5014–5019.

Kung, C–y et al. (Mar. 1999), "Single–molecule analysis of ultradilute solutions with guided streams of 1 –$\mu$m water droplets," *Applied Optics* 38(9): 1481–1487.

Limbach, P.A., (1996), "Indirect mass spectrometric methods for characterizing and sequencing oligonucleotides," *Mass Spectrometry Reviews* 15:297–336.

Liu, P. et al. (1995), "Generating particle beams of controlled dimensions and divergence: II. Experimental evaluation of particle motion in aerodynamic lenses and nozzle expansions," *Aerosol Sci. and Tech.* 22:314–324.

Liu, P. et al. (1995), "Generating particle beams of controlled dimensions and divergence: I. Theory of particle motion in aerodynamic lenses and nozzle expansions," *Aerosol Sci. and Tech.* 22:293–313.

Luginbuhl, Ph. et al. (May 2000), "Femtoliter injector for DNA mass spectrometry," *Sensors and Actuators B* 63:167–177.

Mann, M. et al. (1989), "Interpreting mass spectra of multiply charged ions," *Anal. Chem.* 61:1702–1708.

McLuckey, S.A. et al. (Mar. 1998), "Ion/Ion proton–transfer kinetics: implications for analysis of ions derived from electrospray of protein mixtures" *Anal. Chem.* 70:1198–1202.

Miliotis, T. et al. (Mar. 2000), "Capillary liquid chromatography interfaced to matrix–assisted laser desorption/ionization time–of–flight mass spectrometry using an on–line coupled piezoelectric flow–through microdispenser," *J. Mass Spectrometry* 35:369–377.

Mouradian, S. (January 1998) "Separation and Detection of Nucleic Acids," Ph.D. Thesis, Chemistry, University of Wisconsin–Madison.

Mouradian, S. et al. (Mar. 1997), "DNA analysis using an electrospray scanning mobility particle sizer," *Anal. Chem.* 69:919–925.

Ogorzalek et al. (1992), "A new approach for the study of gas–phase ion–ion reactions using electrospray ionization," *J. Am. Soc. Mass Spectrometry* 3:695–705.

Sarkissian, S.N. et al. (Oct. 2000), "Measurement of phenyllactate, phenylacetate, and phenylpyruvate by negative ion chemical ionization–gas chromatography/mass spectrometry in brain of mouse genetic models of phenylketonuria and non–phenylketonuria hyperphenylalaninemia," *Anal. Biochem.* 280:242–249.

Scaif, M. et al. (Jan. 2000), "Charge reduction electrospray mass spectrometry," *Anal. Chem.* 72:52–60.

Scalf, M. et al. (Jan. 1999), "Controlling charge states of large ions," *Science* 28(3):194–197.

Shaw, R.A. et al. (Oct. 1999), "An electrodynamic levitation system for studying individual cloud particles under upper–tropospheric conditions," *J. Atmospheric and Oceanic Tech.* 17(7):940–948.

Smith, L.M. (Sep. 1996), "Sequence from spectrometry: a realistic prospect?", *Nature Biotechnology* 14:1064–1065.

Smith, R.D. et al. (May 1990), "New Developments in biochemical mass spectrometry: electrospray ionization," *Anal. Chem.* 62:882–899.

Smith et al. (1991), "Principles and practice of electrospray ionization–mass spectrometry for large polypeptides and proteins," *Mass Spectrometry Rev.* 10:359–451.

Stephenson, J.L. and McLuckey, S.A. (Nov. 1996), "Ion/Ion proton transfer reactions for protein mixture analysis," *Anal. Chem.* 68:4026–4032.

Stephenson, J.L. and McLuckey, S.A. (Sep. 1998), "Simplification of product ion spectra derived from multiply charged parent ions via ion/ion chemistry," *Anal. Chem.* 70:4026–4032.

Stephenson, J.L. and McLuckey, S.A. (Sep. 1998), "Charge manipulation for improved mass determination of high–mass species and mixture components by electrospray mass spectrometry," *J. Mass Spectrometry* 33:664–672.

Switzer, G.L. (Nov. 1991), "A versatile system for stable generation of uniform droplets," *Rev. Sci. Instrum.* 62(11):2765–2771.

TSI Incorporated, Particle Instrument Division (1999), "GEMMA* method for macromolecule/nanoparticle analysis," online, retrieved on May 13, 2000 from <http://www.tsi.com/particle/product/gemma/gemma.html>.

TSI Incorporated Particle Instruments (1998), "Model 3480 electrospray aerosol generator".

TSI Incorporated Particle Instruments (1999), "Model 3800 aerosol time–of–flight mass spectrometer".

Wang, H. and Hackett, M. (Jan. 1998), "Ionization within a cylindrical capacitor: electrospray without an externally applied high voltage," *Anal. Chem.* 70(2):205–212.

Ebeling. D. (Mar. 9, 2000) "Development of Corona Discharge Charge Reduction Dlectrospray Mass Spectrometry for Analysis of DNA Sequencing Reactions" Research Proposal, University of Wisconsin–Madison, 15pp.

* cited by examiner

CHARGED PARTICLE SOURCE WITH DROPLET CONTROL FOR MASS SPECTROMETRY

CROSS-REFERENCE TO RELATED APPLICATIONS

This application claims priority under 35 U.S.C. 119(e) to provisional patent application 60/280,632, filed Mar. 29, 2001, which is hereby incorporated by reference in its entirety to the extent not inconsistent with the disclosure herein.

STATEMENT REGARDING FEDERALLY SPONSORED RESEARCH OR DEVELOPMENT

This invention was made with United States government support awarded by the following agency: NIH HG01808. The United States government has certain rights in this invention.

FIELD OF INVENTION

This invention is in the field of mass spectrometry and instrumentation for the generation of gas phase ions, particularly in applications to ion sources for mass spectrometry and related analytical instruments.

BACKGROUND OF INVENTION

Over the last several decades, mass spectrometry has emerged as one of the most broadly applicable analytical tools for detection and characterization of a wide variety of molecules and ions. This is largely due to the extremely sensitive, fast and selective detection provided by mass spectrometric methods. While mass spectrometry provides a highly effective means of identifying a wide class of molecules, its use for analyzing high molecular weight compounds is hindered by problems related to generating, transmitting and detecting gas phase analyte ions of these species.

First, analysis of important biological compounds, such as oligonucleotides and oligopetides, by mass spectrometric methods is severely limited by practical difficulties related to low sample volatility and undesirable fragmentation during vaporization and ionization processes. Importantly, such fragmentation prevents identification of labile, non-covalently bound aggregates of biomolecules, such as protein-protein complexes and protein-DNA complexes, that play an important role in many biological systems including signal transduction pathways, gene regulation and transcriptional control. Second, many important biological application require ultra-high detection sensitivity and resolution that is currently unattainable using conventional mass spectrometric techniques. As a result of these fundamental limitations, the potential for quantitative analysis of samples containing biopolymers remains largely unrealized.

For example, the analysis of complex mixtures of oligonucleotides produced in enzymatic DNA sequencing reactions is currently dominated by time-consuming and labor-intensive electrophoresis techniques that may be complicated by secondary structure. The primary limitation hindering the application mass spectrometry to the field of DNA sequencing is the limited mass range accessible for the analysis of nucleic acids. This limited mass range may be characterized as a decrease in resolution and sensitivity with an increase in ion mass. Specifically, detection sensitivity on the order of $10^{-15}$ moles (or $6\times10^{8}$ molecules) is required in order for mass spectrometric analysis to be competitive with electrophoresis methods and detection sensitivity on the order of $10^{-18}$ moles (or $6\times10^{5}$ molecules) is preferable. Higher resolution is needed to resolve and correctly identify the DNA fragments in pooled mixtures particularly those resulting from Sanger sequencing reactions.

In addition to DNA sequencing applications, current mass spectrometric techniques lack the ultra high sensitivity required for many other important biomedical applications. For example, the sensitivity needed for single cell analysis of protein expression and post-translational modification patterns via mass spectrometric analysis is simply not currently available. Further, such applications of mass spectrometric analysis necessarily require cumbersome and complex separation procedures prior to mass analysis.

The ability to selectively and sensitively detect components of complex mixtures of biological compounds via mass spectrometry would tremendously aid the advancement of several important fields of scientific research. First, advances in the characterization and detection of samples containing mixtures of oligonucleotides by mass spectrometry would improve the accuracy, speed and reproducibility of DNA sequencing methodologies. In addition, such advances would eliminate problematic interferences arising from secondary structure. Further, enhanced capability for the analysis of complex protein mixtures and multi-subunit protein complexes would revolutionize the use of mass spectrometry in the field of proteomics. Important applications include: protein identification, relative quantification of protein expression levels, identification of protein post-translational modifications, and the analysis of labile protein complexes and aggregates. Finally, advances in mass spectrometric analysis of samples containing complex mixtures of biomolecules would also provide the simultaneous characterization of both high molecular weight and low molecular weight compounds. Detection and characterization of low molecular weight compounds, such as glucose, ATP, NADH, GHT, would aid considerably in elucidating the role of these molecules in regulating a myriad of important cellular processes.

Mass spectrometric analysis involves three fundamental processes: (1) desorption and ionization of a given analyte species to generate a gas phase ion, (2) transmission of the gas phase ion to an analysis region and (3) mass analysis and detection. Although these processes are conceptually distinct, in practice each step is highly interrelated and interdependent. For example, desorption and ionization methods employed to generate gas phase analyte ions significantly influence the transmission and detection efficiencies achievable in mass spectrometry. Significantly, all ion sources currently available for preparation of gas phase ions from large biomolecules result in large ion losses during transmission and mass analysis process. Accordingly, a great deal of research is currently directed at developing new ion sources that provide improved transmission of gas phase analyte ions into conventional devices for analysis and detection.

Conventional ion preparation methods for mass spectrometric analysis have proven unsuitable for high molecular compounds. Vaporization by sublimation or thermal desorption is unfeasible for many high molecular weight species, such as biopolymers, because these compounds tend to have negligibly low vapor pressures. Ionization methods based on the desorption process, however, have proven more effective in generating ions from thermally labile, nonvolatile compounds. Such methods primarily consist of processes that initiate the direct emission of analyte ions from solid or liquid surfaces. Although conventional ion desorption methods, such as plasma desorption, laser desorption, fast particle bombardment and thermospray ionization, are more applicable to nonvolatile compounds, these methods have substantial problems associated with ion fragmentation and low ionization efficiencies for compounds with molecular masses greater than about 2000 Daltons.

To enhance the applicability of mass spectrometry for the analysis of samples containing large molecular weight species, two new ion preparation methods recently emerged: (1) matrix assisted laser desorption and ionization (MALDI) and (2) electrospray ionization (ESI). These methods have profoundly expanded the role of mass spectrometry for the analysis of high molecular weight compounds, such as biomolecules, by providing high ionization efficiency (ionization efficiency=ions formed/molecules consumed in analysis) applicable to a wide range of compounds with molecular weights exceeding 100,000 Daltons. In addition, MALDI and ESI are characterized as "soft" desorption and ionization techniques because they are able to both desorb into the gas phase and ionize biomolecules with substantially less fragmentation than conventional ion desorption methods. Karas et. al, Anal. Chem., 60, 2299–2306 (1988) and Karas et. al, Int. J. Mass Spectrom. Ion Proc., 78, 53–68 (1987) describe the application of MALDI as an ion source for mass spectrometry. Fenn, et. al, Science, 246, 64–71 (1989) describes the application of ESI as an ion source for mass spectrometry.

In MALDI mass spectrometry, the analyte of interest is co-crystallized with a small organic compound present in high molar excess relative to the analyte, called the matrix. The MALDI sample, containing analyte incorporated into the organic matrix, is irradiated by a short (≈10 ns) pulse of UV laser radiation at a wavelength resonant with the absorption band of the matrix molecules. The rapid absorption of energy by the matrix causes it to desorb into the gas phase, carrying a portion of the analyte molecules with it. Gas phase proton transfer reactions ionize the analyte molecules within the resultant gas phase plume. Generally, these gas phase proton transfer reactions generate analyte ions in singly and/or doubly charged states. Upon formation, the ions in the source region are accelerated by a high potential electric field, which imparts equal kinetic energy to each ion. Eventually, the ions are conducted through an electric field-free flight tube where they are separated by mass according to their kinetic energies and are detected.

Although MALDI is able to generate gas phase analyte ions from very high molecular weight compounds (>2000 Daltons), certain aspects of this ion preparation method limit its utility in analyzing complex mixtures of biomolecules. First, fragmentation of analyte molecules during vaporization and ionization gives rise to very complex mass spectra of parent and fragment peaks that are difficult to assign to individual components of a complex mixture. Second, the sensitivity of the technique is dramatically affected by sample preparation methodology and the surface and bulk characteristics of the site irradiated by the laser. As a result, MALDI analysis yields little quantitative information pertaining to the concentrations of the materials analyzed. Finally, the ions generated by MALDI possess a very wide distribution of trajectories due to the laser desorption process, subsequent ion-ion charge repulsion in the plume and collisions with background matrix molecules. This spread in analyte ion trajectories substantially decreases ion transmission efficiencies achievable because only ions translating parallel to the centerline of the mass spectrometer are able to reach the mass analysis region and be detected.

In contrast to MALDI, ESI is a field desorption ionization method that provides a highly reproducible and continuous stream of analyte ions. It is currently believed that the field desorption occurs by a mechanism involving strong electric fields generated at the surface of a charged substrate which extract solute analyte ions from solution into the gas phase. Specifically, in ESI mass spectrometry a solution containing solvent and analyte is passed through a capillary orifice and directed at an opposing plate held near ground. The capillary is maintained at a substantial electric potential (approximately 4 kV) relative to the opposing plate, which serves as the counter electrode. This potential difference generates an intense electric field at the capillary tip, which draws some free ions in the exposed solution to the surface. The electrohydrodynamics of the charged liquid surface causes it to form a cone, referred to as a "Taylor cone." A thin filament of solution extends from this cone until it breaks up into droplets, which carry excess charge on their surface. The result is a stream of small, highly charged droplets that migrate toward the grounded plate. Facilitated by heat and/or the flow of dry bath gases, solvent from the droplets evaporates and the physical size of the droplets decreases to a point where the force due to repulsion of the like charges contained on the surface overcomes the surface tension causing the droplets to fission into "daughter droplets." This fissioning process may repeat several times depending on the initial size of the parent droplet. Eventually, daughter droplets are formed with a radius of curvature small enough that the electric field at their surface is large enough to desorb analyte species existing as ions in solution. Polar analyte species may also undergo desorption and ionization during electrospray by associating with cations and anions in the liquid sample.

Because ESI generates a highly reproducible stream of gas phase analyte ions directly from a solution containing analyte ions, without the need for complex, off-line sample preparation, it has considerable advantages over analogous MALDI techniques. Certain aspects of ESI, however, currently prevent this ion generating method from achieving its full potential in the analysis complex mixtures of biomolecules. First, ions generated in ESI invariably possess a wide distribution of multiply charged states for each analyte discharged because the ionization process proceeds via the formation of highly charged liquid droplets. Accordingly, ESI-MS spectra of mixtures are typically a complex amalgamation of peaks attributable to a large number of populated charged states for every analyte present in the sample. These spectra often possess too many overlapping peaks to permit effective discrimination and identification of the various components of a complex mixture. In addition, highly charged gas phase ions are often unstable and fragment prior to detection, which further increases the complexity of ESI-MS spectra.

Second, a large percentage of ions formed by electrospray ionization are lost during transmission into and through the mass analyzer. Many of these losses can be attributed to divergence in the stream of ions generated. Mutual charge repulsion of ions is a major contributor to beam spreading. In this process, charged droplets and gas phase ions formed by ESI mutually repel each other during transmission from the source to an analysis and detection region. This mutual charge repulsion significantly widens the spatial distribution of the droplet and/or gas phase ion stream and causes significant deviation from the centerline of the mass spectrometer. As the sensitivity of the ESI-MS technique depends strongly on the efficiency with which analyte ions are transported into and through a mass analyzer, the spread in gas phase ion trajectories substantially decreases detection sensitivity attainable in ESI-MS. In addition, spread in ion position is also detrimental to the resolution of the mass determination. For example, in pulsed orthogonal time-of-flight detection, the spread in ion position prior to orthogonal extraction substantially influences the resolution attainable. Divergence of the gas phase ion stream is a major source of deviations in ion start position and, hence, degrades the resolution attainable in the time-of-flight analysis of ions generated by ESI. Typically, small entrances apertures for orthogonal extraction are employed to compensate for these deviations, which ultimately result in a substantial decrease in detection sensitivity.

Finally, ESI, as a continuous ionization source, is not directly compatible with time-of-flight mass analysis. Time-of-flight (TOF) detection is currently the most widely employed detection method for large biomolecules due to its ability to characterize the mass to charge ratio of very high molecular weight compounds. To obtain the benefits from both ESI ion generation and TOF mass analysis, techniques have been developed to segment the continuous ion stream generated in ESI into discrete packets. For example, in conventional TOF analysis electrospray-generated ions are periodically pulsed into an electric field-free-flight tube positioned orthogonal to the axis along which the ions are generated. In the flight tube, the analyte ions are separate by mass according to their kinetic energies and are detected at the end of the flight tube. In this configuration it is essential that the accelerated packets of ions are sufficiently temporally separated with adequate spacing to avoid overlap of consecutive mass spectra. Although ions are generated continuously in ESI-TOF, mass analysis by orthogonal extraction is limited by the duty cycle of the extraction pulse. Most ESI-TOF instruments have a duty cycle between 5% and 50%, depending on the m/z range of the ions being analyzed. Therefore, the majority of ions formed in ESI-TOF are never actually mass analyzed or detected because ion production is not synchronized with detection.

Recently, research efforts have been directed at developing new field desorption ion sources that provide more efficient transmission and detection of the ions generated. One method of improving the transmission and detection efficiencies of ions generated by field desorption involves employing pulsed charged droplet sources that are capable of generating a stream of discrete, single droplets or droplet packets with directed momentum. As the droplets generated by such a droplet source are temporally and spatially separated, mutual charge repulsion between droplets is minimized. Further, ion formation and detection processes may be synchronized by employing a pulsed source, which eliminates the dependence of detection efficiency on the duty cycle of orthogonal extraction in time-of-flight detection.

Hager et. al reported a mass spectrum of dodecyldiamine (Molecular Mass=201 amu) by incorporating a pulsed droplet source with a Sciex TAGA 6000E mass spectrometer [Hager, D. B. et. al, Appl. Spectrosc., 46, 1460–1463 (1992)]. Using a piezoelectric source, they reported generation of a continuous stream of neutral droplets. After formation, the droplets were charged using an external charging element comprising a corona discharge positioned near the droplet stream. While Hager et al. report successful ion generation via field desorption of droplets generated by a piezoelectric source, electric fields generated by the external corona discharge were observed to significantly perturbed the trajectories of the charged droplets generated. Specifically, FIG. 3 of this reference indicates that the corona discharged caused deflection of droplet trajectories up to approximately 45° from the original trajectory of the droplet. Accordingly, Hager et al. report decreases in ion intensities by a factor of 2–3 relative to conventional electrospray ionization. Further, Hager et al. report no results with higher molecular weight species. Finally, the apparatus described by Hager et al. is not amenable to single droplet production or discretely controlled droplet formation because it employs a continuous droplet source which utilizes Rayleigh breakup of a liquid jet that in not capable of discrete pulsed droplet generation.

Feng et al. recently reported the combination of a droplet on demand piezoelectric dispenser with an electrodynamic trap to provide a pulsed source of gas phase ions [Feng et al., J. Am. Soc. Mass Spectrom., 11, 393–399 (2000)]. The electrodynamic trap consisted of two ring electrodes to which an RF voltage signal was applied between the electrodes to counter the downward force on the droplet due to gravity. Droplets were generated by a pulsed piezoelectric dispenser and charged with an external induction electrode. The authors report a 100% efficiency in capturing discrete droplets generated by the pulsed piezoelectric dispenser. The droplets remained in the electrodynamic trap until they were evaporated and/or desolvated to induce droplet fission. The droplet itself and daughter droplets, which formed during desolvation, were reported to exit the trap vertically through the upper electrode and were subsequently detected by a channel electron multiplier housed in a vacuum chamber. While Feng et al. were able to direct the exit of the parent and daughter droplets out of the electrodynamic trap, they report very poor ion transfer efficiency to the vacuum chamber. The decreased ion transfer efficiency was likely due to divergence of charged droplets upon leaving the droplet trap from the selected droplet trajectory. Feng et al. report no results with high molecular weight compounds or any applications of their ion source involving mass analysis.

Another approach to increase gas phase ion transmission and detection efficiencies involves reducing ion beam divergence using external devices to collimate charged droplets and gas phase ions formed by field desorption methods. Electrostatic ion lenses are routinely used to minimize ion beam divergence. While electrostatic ion lens may be employed to collimate or focus a diverging ion beam, most lens systems exhibit aberrations, which minimize the optimum focus conditions to a narrow mass to charge ratio (m/z) window over a limited energy range. In addition, ions that are brought to a focus via an electrostatic lens quickly diverge once past the focal point and, thus, ultimately may not be transmitted and detected.

Lui et al. describe an aerodynamic lens system that is capable of concentrating suspended particles around a central axis without the use of electrostatic lenses [Lui et al., Aerosol Science and Technology, 22, 293–313 (1995), Lui et al., Aerosol Science and Technology, 22, 314–324 (1995)]. Specifically, the authors report the used of an aerodynamic lens systems to transport droplets and particles from an intermediate pressure region (0.01–0.1 Torr) into a region of high vacuum (approximately $1\times10^{-5}$ Torr) that utilizes a flow of background gas to focus in place of electric potentials. Utilizing a stream of polydispersed NaCl particles with diameters less than 0.2 $\mu$m produced by atomization, Lui et al. report greater than 90% transport efficiency to a high vacuum detection region, particle beam diameters ranging from 0.7 to 3.0 mm and particle velocities ranging from 60 to 200 meters per second. Lui et al. do not, however, describe use of an aerodynamic lens system in field desorption ion sources. Additionally, the authors do not report use of the aerodynamic lens system for sampling in mass analysis.

It will be appreciated from the foregoing that a need exists for field desorption ion sources that are capable of generating a stream of single gas phase ions or discrete, packets of gas phase ions having reduced divergence and improved spatial uniformity. The present invention provides a gas phase ion sources able to provide controlled, production of gas phase ions or discrete packets of gas phase ions, from chemical species, including high molecular weight biopolymers, with directed momentum along an ion production axis. Further, this invention describes methods and devices of determining the identity and concentration of chemical species in liquid samples using this gas phase ion source in combination with charged particle analysis.

SUMMARY OF THE INVENTION

This invention provides methods, devices, and device components for improving mass spectrometric analysis, particularly of high molecular weight compounds, including biological polymers. In particular, this invention achieves improved sensitivity, detection efficiency and resolution in mass spectrometry and related analytical methods. More specifically, the invention provides ion sources, devices for high efficiency conveyance of ions to mass analysis regions, methods for generating ions and methods for mass analysis of liquid samples, electrically charged droplets generated from liquid samples, electrically charged single droplets of liquid samples and gas phase ions generated from electrically charged droplets. Also provided are mass spectrometers, which comprise the devices and device components of this invention.

The present invention provides methods and devices for generating gas phase ions from liquid samples containing chemical species, including but not limited to chemical species with high molecular mass. The methods and devices of the present invention provide a source of charged particles, of either positive or negative polarity, preferably having a momentum substantially directed along a production axis. More specifically, the present invention provides a gas phase ion source in which the gas phase ion formation time and spatial distribution of gas phase ions along a production axis is selectively adjustable.

In one aspect, the invention provides a charged particle source comprising a primary electrically charged droplet of a liquid containing chemical species in a solvent carrier liquid or both held in a charged droplet trap. The primary electrically charged droplet is held in the droplet trap for a selected residence time to provide evaporation or desolvation of solvent carrier liquid or both from the primary electrically charged droplet. At least partial evaporation of the primary electrically charged droplet generates at least one secondary electrically charged droplet of a selected size, gas phase analyte ions or a combination of secondary electrically charged droplets of selected size and gas phase ions which exit the trap at a selected release time. In a preferred embodiment, the secondary electrically charged droplets of a selected size, gas phase analyte ions or both exit the charged droplet trap with a momentum substantially directed along an ion production axis. In a more preferred embodiment, the secondary electrically charged droplets of a selected size, gas phase analyte ions or both exit the charged droplet trap with a substantially uniform trajectory.

Charged droplet traps useable in the present invention may be any trap capable of holding a primary electrically charged droplet of liquid sample for a selected residence time including, but not limited to, electrostatic droplet traps, electrodynamic droplet traps, magnetic droplet traps, optical droplet traps and acoustical droplet traps. An electrodynamic charged droplet trap is preferred because it allows for accurate control over the trajectory of the secondary electrically charged droplets of selected size and/or gas phase analyte ions exiting the charged droplet trap.

The rate of evaporation or desolvation of the primary electrically charged droplet held in the charged droplet trap is selectably adjustable in the present invention. This can be accomplished by methods well known in the art including, but not limited to, (1) heating the electrically charged droplet trap, (2) introducing a flow of dry bath gas to the electrically charged droplet trap, (3) selection of the solvent and/or carrier liquid, (4) selection of the charged state of the charged droplets or (5) combinations of these methods with other methods known in the art. Controlling the rate of evaporation of primary electrically charged droplets provides control over the size and release time of secondary electrically charged droplets and is beneficial because it allows for high efficiency of gas phase ion formation and synchronization of ion formation time and subsequent mass analysis and detection.

The primary electrically charged droplets may be generated by any means capable of generating electrically charged droplets from liquid solutions containing chemical species in a solvent, carrier liquid or both. In a preferred embodiment, an electrically charged droplet source is employed that generates primary electrically charged droplets that leave the droplet source at a selected droplet exit time with a momentum substantially directed along a droplet production axis. In this embodiment, the charged droplet trap is positioned along the droplet production axis at a selected distance downstream from the electrically charged droplet source. A charged droplet source capable of generating primary electrically with momentum substantially directed along a droplet production axis is preferred because it enhances the capture efficiency of the charged droplet trap for capturing primary electrically charged droplets.

The primary electrically charged droplets exit the charged droplet source at a selected exit time and are conducted along the droplet production axis by a flow of bath gas provided through a flow inlet in fluid communication with the charged droplet source and the charged droplet trap. In a preferred embodiment the flow rate of bath gas is selectively adjustable by a flow controller. Flow controllers and other methods of regulation of a flow of bath gas are well known in the art.

The primary electrically charged droplets enter the charged droplet trap, are held for a selected residence time and undergo at least partial evaporation or desolvation resulting in the generation of at least one secondary charged droplet of selected size, gas phase ions or a combination of secondary charged droplet of selected size and gas phase ions. The secondary electrically charged droplets of selected size, gas phase ions, or both, exit the trap at a selected release time, and preferably have a momentum substantially directed along an ion production axis.

In another aspect of the invention, a charged particle source of the present invention is operationally coupled to an aerodynamic lens system of selected length. This embodiment provides a source of gas phase ions having momentum substantially directed along an ion production axis with substantially uniform, well-defined trajectories. This embodiment is especially beneficial because it improves gas phase ion transmission efficiency to a mass analysis region, particularly a mass spectrometer. The charged particle source comprises a primary charged droplet held in a charged droplet trap. The charged droplet trap is in fluid communication with the aerodynamic lens system to convey secondary droplets of selected size or gas phase ions through the aerodynamic lens system.

In this embodiment, the aerodynamic lens system is positioned along the ion production axis at a selected distance downstream of the charged particle source for receiving the flow of bath gas, secondary electrically charged droplets of selected size and/or gas phase ions. The aerodynamic lens system has an optical axis coaxial with the ion production axis, an internal end and an external end. In an exemplary embodiment, the aerodynamic lens system comprises a plurality of apertures positioned at selected distances from the charged droplet trap along the ion production axis, where each aperture is concentrically positioned about the ion production axis. The flow of bath gas, secondary electrically charged droplets of selected size, gas phase ions or any combination of these enter the internal end of the aerodynamic lens system. At least partial evaporation or desolvation of solvent, carrier liquid or both from the secondary electrically charged droplets of selected size in the aerodynamic lens system generates gas phase ions. The flow of bath gas through the lens system focuses the spatial distribution of the secondary electrically charged droplets of selected size, gas phase ions or both about an ion production axis. The secondary electrically charged droplets of selected size, gas phase or both exit the external end of the aerodynamic lens system at a selected exit time having a momentum substantially directed along the ion production axis.

In a preferred embodiment, the flow of bath gas through the aerodynamic lens systems is laminar. The flow rate and flow characteristics of the flow of bath gas may be selectably adjusted by incorporation of a flow rate controller to the internal or external end of the aerodynamic lens system. Methods of generating a laminar flow of bath gas are well known in the art. In another preferred embodiment, gas phase ions are formed only after substantially complete evaporation or desolvation of solvent, carrier liquid or both from the secondary electrically charged droplets of selected size. Ion formation after substantially complete evaporation of desolvation is preferred because it increases the uniformity of ion trajectories exiting the aerodynamic lens system.

In another alternative embodiment, the aerodynamic lens system is substantially free of electric fields, electromagnetic fields or both generated from sources other than the secondary electrically charged droplets of selected size and the gas phase ions. In a particular embodiment of the present invention, the electric fields, electromagnetic fields or both generated by the charged droplet trap are substantially minimized in the aerodynamic lens system. Maintaining an aerodynamic lens system substantially free of electric fields, electromagnetic fields or both is desirable to prevent disruption of the well-defined trajectories of the gas phase ions generated. In addition, minimizing the extent of electric fields, electromagnetic fields or both is beneficial because it prevents unwanted loss of secondary electrically charged droplets of selected size and/or gas phase ions on the walls of the aerodynamic lens system.

In another embodiment of the ion source of the present invention, a plurality of aerodynamic lens systems is operationally connected to the charged droplet trap. In this embodiment, an aerodynamic lens system may also be placed upstream of the charged droplet trap to provide a uniform droplet trajectory from the electrically charged droplet source to the charged droplet trap.

In another aspect of the present invention, the charged particle source of the present invention is operationally connected to a field desorption-charge reduction region to provide a gas phase ion source with selective control over the charge state distribution of the gas phase ions generated. Within the field desorption-charge reduction region, the secondary electrically charged droplets of selected size and/or gas phase analyte ions are exposed to electrons and/or gas phase reagent ions of opposite polarity generated from bath gas molecules by a reagent ion source positioned at a selected distance downstream of the electrically charged droplet source. Electrons, reagent ions or both, generated by the reagent ion source, react with secondary electrically charged droplets, analyte ions or both within at least a portion of the field desorption-charge reduction region and reduce the charge-state distribution of the gas phase analyte ions in the flow of bath gas. Accordingly, ion-ion, ion-droplet, electron-ion and/or electron-droplet reactions result in the formation of gas phase analyte ions having a selected charge-state distribution. In a preferred embodiment, the charge state distribution of gas phase analyte ions is selectively adjustable by varying the interaction time between gas phase analyte ions and/or secondary electrically charged droplets and the gas phase reagent ions and/or electrons. In addition, the charge-state of gas phase analyte ions may be controlled by adjusting the rate of production of electrons, reagent ions or both from the reagent ion source.

In another embodiment, the charged particle source of the present invention is operationally coupled to an online purification system to achieve solution phase separation of solutes in a liquid sample containing analytes prior to formation of the primary electrically charged droplets. The online purification system may be any instrument or combination of instruments capable of online liquid phase separation. Prior to droplet formation, liquid sample containing solute is separated into fractions, which contain a subset of species (including analytes) of the original solution. For example, separation may be performed so that each analyte is contained in a separate fraction. On line purification methods useful in the present invention include but are not limited to high performance liquid chromatography, capillary electrophoresis, liquid phase chromatography, super critical fluid chromatography, microfiltration methods and flow sorting techniques.

In another embodiment, the ion source of the present invention comprises an ion source without the need for online separation and/or purification of the chemical species prior to gas phase ion formation. In this embodiment, solution phase composition is selected such that each primary electrically charged droplet formed by the electrically charged droplet source contains only one chemical species in a solvent, carrier liquid or both. For example, a single analyte ion per primary electrically charged droplet may be achieved by employing a concentration of less than or equal to about 20 picomoles per liter for a droplet volume of about 10 picoliters. In this embodiment, only one gas phase analyte is released to the gas phase and ionized per primary electrically charged droplet. As only one ion is formed per droplet, the chemical species in the liquid sample are spatially and temporally separated and, hence, absolutely purified upon ion formation. In a more preferred embodiment, the repetition rate of the charged particle source is selected such that it provides a stream of individual gas phase analyte ions that are spatially separated such that the individual gas phase analyte ions do not substantially exert forces on each other due to mutual charge repulsion. Minimizing mutual charge repulsion between gas phase analyte ions is beneficial because is preserves the well-defined trajectory of each analyte ion along the ion production axis.

Although the ion source of the present invention may be used to generate ions from any chemical species, it is particularly useful for generating ions from high molecular weight compounds, such as peptides, oligonucleotides, carbohydrates, polysaccharides, glycoproteins, lipids and other biopolymers. The methods are generally useful for generating ions from organic polymers. In addition, the ion source of the present invention may be utilized to generate gas phase analyte ions, which possess molecular masses substantially similar to the molecular masses of the parent chemical species from which they are derived while present in the liquid phase. Accordingly, the present invention provides an ion source causing minimal fragmentation to occur during the ionization process. Most preferably for certain applications, the present invention may be utilized to generate gas phase analyte ions with a selectably adjustable charge state distribution.

In another aspect of the invention, the ion source is operationally coupled to a charged particle analyzer capable of identifying, classifying, detecting and or quantifying charged particles. This embodiment provides a method of determining the composition and identity of substances, which may be present in a mixture. In an exemplary embodiment, the ion source of the present invention is operationally coupled to a mass analyzer and provides a method of identifying the presence of and quantifying the abundance of analytes in liquid samples. In a preferred embodiment, the charged particle axis and/or ion production axis is coaxial with the centerline of the mass analyzer to provide optimal ion transmission efficiency. In this embodiment, the output of the ion source is drawn into a mass analyzer to determine the mass to charge ration (m/z) of the ions generated from the ion source of the present invention.

In an exemplary embodiment, the ion source of the present invention is coupled to an time of flight (TOF) mass spectrometer to provide accurate measurement of m/z for compounds with molecular masses ranging from about 1 amu to about 50,000 amu. In a preferred embodiment, the flight tube of the time-of-flight mass spectrometer is positioned coaxial with the ion production axis and/or the charged particle axis. Alternatively, the flight tube of the time-of-flight mass spectrometer may be positioned orthogonal to the ion production axis and/or the charged particle axis. In either embodiment, the ion formation process may be synchronized with mass analysis and detection. For time-of-flight analysis employing a coaxial flight tube geometry this may be accomplished by synchronizing the release time of gas phase ions, secondary electrically charged droplets or both from the charged droplet trap with the linear acceleration pulse of the time-of-flight detector. For time-of-flight analysis employing an orthogonal flight tube geometry this may be accomplished by synchronizing the release time of gas phase ions, secondary electrically charged droplets of selected size or both from the charged droplet trap with the orthogonal extraction pulse of the time-of-flight detector. Synchronization of the release time of ions and/or secondary electrically charged droplets of selected size with mass analysis is beneficial because it provides a detection efficiency (detection efficiency=(ions detected)/(ion formed)) independent of the duty cycle of the TOF mass analyzer. Other exemplary embodiments of the present invention include, but are not limited to, ion sources of this invention operationally coupled to quadrupole mass spectrometers, tandem mass spectrometers, multistage mass spectrometers, ion traps or combinations of these mass analyzers.

In a preferred embodiment, the ion source of the present invention is operationally coupled to a mass spectrometer to provide a method of single droplet mass spectrometry providing high ion transmission and detection efficiencies. In this embodiment, a primary electrically charged droplet containing a plurality chemical species in a solvent, carrier liquid or both is generated by the electrically charged droplet source and subsequently trapped in the charged droplet trap. At least partial evaporation or desolvation of the primary electrically charged droplet held in the charged droplet trap generates at least one secondary electrically charged droplet of selected size, which exit the trap at a selected release time and are conducted by a flow of bath gas through an aerodynamic lens system. In a preferred embodiment, a single secondary electrically charged droplet of selected size is generated from the primary electrically charged droplet. At least partial evaporation or desolvation of solvent, carrier liquid or both from the secondary electrically charged droplet of selected size generates a plurality of gas phase analyte ion having a momentum directed substantially along an ion production axis. In a more preferred embodiment, the individual gas phase ions generated travel along a well-defined, substantially uniform trajectory. The gas phase ions are conducted into a mass analysis region, preferably a time-of-flight detector positioned such that its centerline is coaxial with the ion production axis, where they are mass analyzed and detected. Detectors suitable for detection of a gas phase ions are well known in the art and include but are not limited to inductive detectors, multichannel plate detectors, scintillation detectors, semiconductor detectors, cryogenic detectors and channel electron multipliers.

The devices and methods of single droplet mass spectrometry of the present invention have a number of important advantages. First, as the electrically charged, single droplets of liquid sample generated may be spatially and temporally separated along the ion production axis to substantially prevent mutual charge repulsion, the technique has the potential for high ion transmission efficiency (ion transmission efficiency=ions generated/ions transmitted to mass analysis region). Second, the technique utilizes minute sample quantities (e.g. 20 picoliters) and, therefore, is amenable to the analysis of liquid samples available in very small quantities, such as samples generated from single cells. Finally, as the release time of secondary electrically charged droplets of selected size from the charged droplet trap can be precisely selected, ion formation processes and mass analysis events can be synchronized, eliminating the dependence of detection efficiency on duty cycle.

Alternatively, the ion source of the present invention may be operationally coupled to a mass spectrometer to provide a method of single particle mass spectrometry providing high ion transmission and detection efficiencies. In this embodiment, the concentration of chemical species is selected to generate a primary electrically charged droplet containing a single chemical species in a solvent, carrier liquid or both. Upon at least partial evaporation or desolvation of the charge droplet held in the charged droplet trap, a single gas phase analyte ion having a momentum directed substantially along an ion production axis is generated. The single gas phase ion is conducted into a mass analysis region and detected. Detectors suitable for detection of a single gas phase ion are known in the art an include but are not limited to inductive detectors, multichannel plate detectors, scintillation detectors, semiconductor detectors, cryogenic detectors and channel electron multipliers.

In addition to the benefits of single droplet mass spectrometry, single particle mass spectrometry has a several additional advantages. First, as the ions are generated discretely and may be spatially separated along the ion production axis to substantially prevent mutual charge repulsion of the ion beam itself, the technique has the potential for unity ion transmission efficiency (ion transmission efficiency=ions generated/ions transmitted to mass analysis region). Second, the technique provides an efficient method of separation of chemical species in complex mixtures providing absolute purification without the need for independent on-line purification prior to analysis. Further, because a single ion is generated and individually mass analyzed the corresponding mass spectrum obtained is easy to assign.

The present invention also provides devices and methods for enhancing ion transmission efficiency for field desorption ion sources. In a preferred embodiment, a source of electrically charged droplets is operationally coupled to an aerodynamic lens system. In this configuration, the aerodynamic lens system functions as an interface between a high-pressure region in which droplets are produced and a low pressure mass analysis region. Secondary charged droplets are conducted through the aerodynamic lens system by a flow of bath gas that focuses the spatial distribution of the charged droplets about the ion formation axis. The ion production axis is positioned coaxial to the centerline axis of a mass analyzer, such as a time-of-flight detector. This alignment is preferred because it provides significant improvement of ion transmission efficiency over conventional ion sources and results in increased sensitivity in the subsequent mass analysis and detection of chemical species.

Partial evaporation or desolvation of solvent, carrier liquid or both generates gas phase ions in the aerodynamic lens system having a momentum substantially directed along the ion production axis. The gas phase analyte ions exit the aerodynamic lens system, pass through an aperture and enter a mass analysis region, preferably a time-of-flight mass analyzer. It should be understood by persons of ordinary skill in the art that the method of improving ion transmission efficiency of the present invention may be adapted to any source of electrically charged droplets and any means of mass analysis. Pulsed sources of primary electrically charged droplets are preferred because mutual charged repulsion between primary electrically charged droplets can be minimized and mass analysis and subsequent detection may be synchronized.

Alternatively, the ion source of the present invention may be operationally connected to a device capable of classifying and detecting gas phase analyte ions on the basis of electrophoretic mobility. In an exemplary embodiment, the ion source of the present invention is coupled to a differential mobility analyzer (DMA) to provide a determination of the electrophoretic mobility of ions generated from liquid samples. This embodiment is beneficial because it allows ions of the same mass to be distinguished on the basis of their electrophoretic mobility, which in turn depends on the molecular structure of the gas phase ions analyzed.

In a preferred embodiment, the method of determining the composition and identity of substances in the present invention is used to analyze the composition of individual cells. In this embodiment, the liquid sample is prepared by lysing an individual analyte cell and subsequently separating the biomolecules, such as proteins and DNA, into separate fractions via a suitable liquid phase purification method. Next, the liquid sample is analyzed using the methods and devices of the present invention for determining the composition and identity of substances in liquid samples. The method of single cell analysis of the present invention is beneficial because it provides the high sensitivity to allow for detection of very low levels of biomolecules present in a single cell. In addition, the methods of the present invention are desirably because the ability to prepare gas phase ions of selected charge state, preferably low charge states, allows for the detection and characterization of non-covalently bound aggregates of biomolecules present in individual analyte cells.

The invention further provides methods of generating ions employing the device configurations described herein. Additionally, the invention provides methods for the analysis of liquid samples, particularly biological samples, employing the device configurations described herein.

The invention is further illustrated by the following description, examples and drawings.

DETAILED DESCRIPTION OF THE INVENTION

Figure 1A:
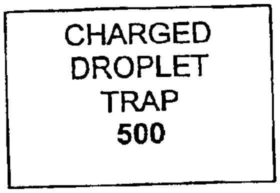
FIGS. 1A–G show exemplary device configurations of the present invention.

Definitions:

The following definitions apply herein

"Chemical species" refers generally and broadly to a collection of one or more atoms, molecules and/or macromolecules whether neutral or ionized. In particular, reference to chemical species in the present invention includes but is not limited to polymers. Chemical species in a liquid sample may be present in a variety of forms including acidic, basic, molecular, ionic, complexed and solvated forms. Chemical species also includes non-covalently bound aggregates of molecules. Chemical species includes biological molecules, i.e. molecules from biological sources, including biological polymers, any or all of which may be in the forms listed above or present as aggregates of two or more molecules.

"Polymer" takes its general meaning in the art and is intended to encompass chemical compounds made up of a number of simpler repeating units (i.e., monomers), which typically are chemically similar to each other, and may in some cases be identical, joined together in a regular way. Polymers include organic and inorganic polymers that may include co-polymers and block co-polymers. Reference to biological polymers in the present invention includes, but is not limited to, peptides, proteins, glycoproteins, oligonucleotides, DNA, RNA, polysaccharides, and lipids and aggregates thereof.

"Ion" refers generally to multiply or singly charged atoms, molecules, macromolecules of either positive or negative polarity, and may include charged aggregates of one or more molecules or macromolecules.

"Electrically charged droplets" refers to droplets of a liquid sample in the gas phase that have an associated electrical charge. Electrically charged droplets can have any size (e.g., diameter). Electrically charged droplets may be composed of any combinations of the following: solvent, carrier liquid and chemical species. Electrically charged droplets may be singly or multiply charged and may possess positive or negative polarity. Electrically charged droplets may be of a selected size. Primary electrically charged droplets are formed directly from a charged droplet source. In contrast, secondary droplets are generated from at least partial evaporation or desolvation of primary electrically charge droplets. Evaporation of a primary electrically charged droplet may result in the formation of one or more secondary electrically charged droplets.

"Charged particles" refers to any material in the gas phase having an electric charge of either positive or negative polarity. For example, charged particles may refer to primary charged droplets, secondary charged droplets, partially evaporated or desolvated droplets, completely evaporated or desolvated droplets, ions, aggregates of ions, ion complexes and clusters.

"Aggregate(s)" of chemical species refer to two or more molecules or ions that are chemically or physical associated with each other in a liquid sample. Aggregates may be non-covalently bound complexes. Examples of aggregates include but are not limited to protein-protein complexes, lipid-peptide complexes, protein-DNA complexes.

"Piezoelectric element" refers to an element that is composed of a piezoelectric material that exhibits piezoelectricity. Piezoelectricity is a coupling between a material's mechanical and electrical behaviors. For example, when a piezoelectric material is subjected to a voltage drop it mechanically deforms. Many crystalline materials exhibit piezoelectric behavior including, but not limited to quartz, Rochelle salt, lead titanate zirconate ceramics (e.g. PZT-4, PZT-5A), barium titanate and polyvinylidene fluoride.

The phrase "momentum substantially directed along an axis" refers to motion of an ion, droplet or other charged particle that has a velocity vector that is substantially parallel to the defining axis. In preferred embodiments, the invention of the present application provides droplet sources and ion sources with output having a momentum substantially directed along the droplet production axis. In the present invention, the defining axis is selectably adjustable and may be a droplet production axis, an ion production axis or the centerline axis of a mass spectrometer. The term "momentum substantially directed" is intended to be interpreted consistent with the meaning of this term by persons of ordinary skill in the art. The term is intended to encompass some deviations from a trajectory absolutely parallel to the defining axis. These deviations comprise a cone of angles deviating from the defining axis. It is preferable for many applications that deviations from the defining axis are minimized. Deviations for charged particles generated by operation of the charged droplet and gas phase ion sources of the present invention in discrete droplet mode includes droplet and/or gas phase ion trajectories that deviate from the defining axis by 20° or less. It is preferred in some applications, such as the use of ion sources of the present invention to transmit ions to a mass analysis region, that the deviations of charged droplet and/or gas phase ion trajectories from parallel to the reference axis be 5° or less. It is more preferred in some applications, such as the use of ion sources of the present invention to generate a single ion and transmit the ion to a mass analysis region, that the deviations of charged droplet and/or gas phase ion trajectories from parallel to the reference axis be 1° or less.

"Gas phase analyte ion(s)" refer to multiply charged ions, singly charged ions or both generated from chemical species in liquid samples. Gas phase analyte ions of the present invention may be of positive polarity, negative polarity or both. Gas phase analyte ions may be formed directly upon at least partial evaporation of solvent and/or carrier liquid from charged droplets. Gas phase analyte ions are characterized in terms of their charge-state, which is selectively adjustable in the present invention.

A "pressure wave" refers to a pulsed force, applied over a given unit area. For example, in the present invention a radially contracting pulse pressure wave is created within an axial bore that comprises a force that emanates from the cylindrical walls of an axial bore and is direct toward the central axis of the cylinder. In the present invention, the pressure wave is conveyed through a dispenser element and creates a shock wave in the sample solution. This shock wave results in a pressure fluctuation in the liquid sample that generates a single charged droplet or a pulsed elongated stream of droplets out the dispensing end of a dispensing tube. Non-radial pressures waves are expressly included within the definition of pressure wave.

"Solvent and/or carrier liquid" refers to compounds or mixtures present in liquid samples that dissolve or partially dissolve chemical species and/or aid in the dispersion of chemical species into droplets. Typically, solvent and/or carrier liquid are present in liquid samples in greatest abundance than chemical species (e.g., the analytes) therein. Solvents and carrier liquids can be single components (e.g., water or methanol) or a mixture of components (e.g., an aqueous methanol solution, a mixture of hexanes) Solvents are materials that dissolve or at least partially dissolve chemical species present in a liquid sample. Carrier liquids do not dissolve chemical species in liquid solutions but still assist in the dispersion of chemical species into droplets. Some chemical species are partial dissolved in liquid solutions such that one material may be both a solvent and a carrier liquid.

"Field desorption region" refers to a region downstream of the electrically charged droplet source with respect to passage of charged droplets emanating from the droplet source, e.g., the direction of the flow of bath gas carrying the droplets. Within the field desorption region, charged droplets are at least partially evaporated or desolvated resulting in the formation of smaller charged droplets and gas phase analyte ions.

"Liquid sample" refers to a homogeneous mixture or heterogeneous mixture of at least one chemical species and at least one solvent and/or carrier liquid. Commonly, liquid samples comprise liquid solutions in which chemical species are dissolved in at least one solvent. An example of a liquid sample useable in the present invention is a 1:1 $MeOH/H_2O$ solution containing one or more oligonucleotide or oligopeptide compound. Liquid samples may be obtained from a variety of natural or artificial sources and may contain biological species generated in nature or synthesized chemical species. Liquid samples may be biological samples including tissue or cell lysates or homogenates, serum, other biological fluids, cell growth media, tissue extracts, or soil extracts. A liquid sample may be derived from a discrete source such as a single cell or from a heterogeneous sample, such as a mixture of biological species. Liquid samples may also include samples of organic polymers, including biological polymers, including copolymers and block copolymers. Liquid samples may be directed introduced into the charged droplet source of this invention or pretreated to extract, separated, modify or purify the sample.

"Substantially uniform" in reference to the volume of charged droplets generated in discrete droplet mode refer to droplets that are in about 1% of a selected droplet volume.

"Bath gas" refers to a collection of gas molecules that transport charged droplets and/or gas phase analyte ions through a field desorption region. Preferably, bath gas molecules do not chemically interact with the droplets and/or gas phase ions generated by the present invention. Common bath gases include, but are not limited to, nitrogen, oxygen, argon, air, helium, water, sulfur hexafluoride, nitrogen trifluoride and carbon dioxide.

"Downstream" and "upstream" refers to the direction of flow of a stream of ions, molecules or droplets. Downstream and upstream is an attribute of spatial position determined relative to the direction of a flow of bath gas, gas phase analyte ions and/or droplets.

"Linear flow rate" refers to the rate by which a flow of materials pass through a given path length. Linear flow rate is measure in units of length per unit time (typically cm/s.

"Charged particle analyzer" refers generally to any device or technique for determining the identity, physical properties or abundance of charged particles. In addition, charge particle analyzers include devices that detect the presence of charged particles, that detect the m/z of an ion or that detect a property of an ion that is related to the mass, m/z, identity or chemical structure of an ion. Examples of charged particle analyzers include, but are not limited to, mass analyzers, mass spectrometers and devices capable of measuring electrophoretic mobility such as a differential mobility analyzer.

A "mass analyzer" is used to determine the mass to charge ratio of a gas phase ion. Mass analyzers are capable of classifying positive ions, negative ions or both. Examples include, but are not limited to, a time of fight mass spectrometer, a quadrupole mass spectrometer, residual gas analyzer, a tandem mass spectrometer, multi-stage mass spectrometers and an ion cyclotron resonance detector.

"Residence time" refers to the time a flowing material spends within a given volume. Specifically, residence time may be used to characterize the time gas phase analyte ions, charged droplets and/or bath gas takes to pass through a field desorption region. Residence time is related to linear flow rate and path length by the following expression: Residence time=(path length)/(linear flow rate).

"Droplet exit time" refers to the point in time in which a droplet exits the dispenser end of the dispenser element of the droplet source herein. In the present invention, droplet exit time is controllable by selectively adjusting the temporal characteristics, such as the initiation time, duration, rise time, fall time and frequency, and amplitude of the pulsed electric potential applied to the piezoelectric element.

"Shielded region" refers to a spatial region separated from a source that generates electric fields and/or electromagnetic fields by an electrically biased or grounded shield element. The extent of electric fields and/or electromagnetic fields generated by the electrode in the shielded region is minimized. The shielded region may include the piezoelectric element and piezoelectric controller.

"Ion charge-state distribution" refers to a two dimensional representation of the number of ions of a given elemental composition populating each ionic state present in a sample of ions. Accordingly, charge-state distribution is a function of two variables; number of ions and ionic state. Ion charge state distribution is a property of a selected elemental composition of an ion. Accordingly it reflects the ionic states populated for a specific elemental composition, but does not reflect the ionic states of all ions present in a sample regardless of elemental composition. "Droplet charge-state distribution" refers to a two dimensional representation of the number of charged droplets of a populating each charged state present in a sample of charged droplets. Accordingly, droplet charge-state distribution is a function of two variables; number of charged droplets and number of charged states associated with a given sample of charged droplets.

"Piezoelectric controller refers" generally to any device capable of generating a pulsed electric potential applied to the piezoelectric element. Various piezoelectric controllers are known in the art. The piezoelectric controller is operationally connected to the piezoelectric element and preferably provides independent control over any or all of the frequency, amplitude, rise time and/or fall time of a pulsed electric potential applied to the piezoelectric element. The temporal characteristics and amplitude of pulsed electric potential control the frequency, amplitude, rise time and fall time of the radially contracting pressure wave created in the axial bore.

"Selectively adjustable" refers to the ability to select the value of a parameter over a range of possible values. As applied to certain aspects of the present invention, the value of a given selectively adjustable parameter can take any one of a continuum of values over a range of possible settings.

Exemplary Device Configurations

This invention provides methods and devices for preparing gas phase analyte ions from liquid samples containing chemical species, particularly suitable for high molecular weight compounds dissolved or carried in liquid samples. Particularly, the present invention provides devices and methods for generating ions having a momentum substantially directed along a production axis. More particularly, the present invention provides methods and devices for providing ions having a well defined and substantially uniform trajectories.

Referring to the drawings, like numerals indicate like elements and the same number appearing in more than one drawing refers to the same element.

Figure 1B:
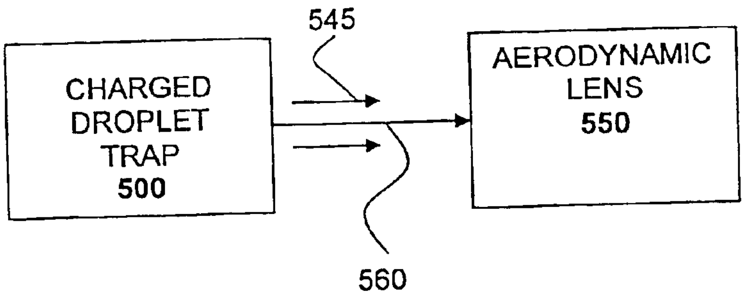
Figure 1C:
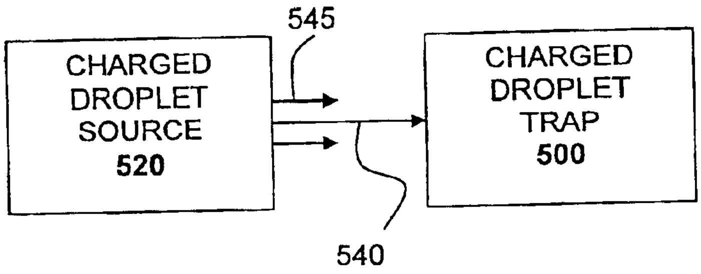
Figure 1D:
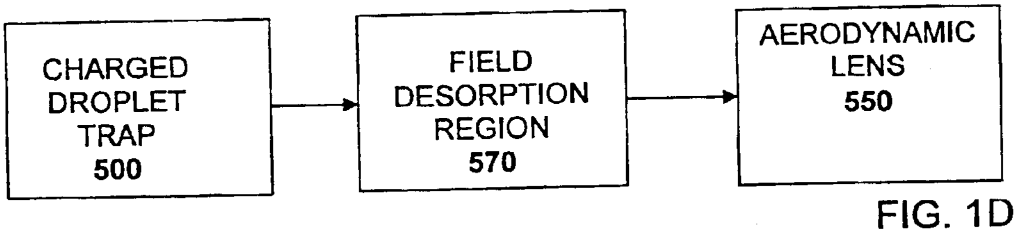

FIGS. 1A–G illustrate several exemplary embodiments of this invention related to ion sources and their applications. It should be recognized that the depicted functions do not show details that should be familiar to those with ordinary skill in the art. FIG. 1A is a functional block diagram of an ion source that is a charged droplet trap for trapping primary electrically charged droplets and generating gas phase ions and/or secondary charged droplets. FIG. 1B is a functional block diagram depicting another ion source configuration in which a charged droplet trap (500) is operationally connected to an aerodynamic lens. FIG. 1C illustrates one configuration for providing charged droplets to the charged droplet trap, an ion source configuration in which a charged droplet source (520) is operationally coupled to a charged droplet trap. FIG. 1D illustrates yet another ion source configuration in which a charged droplet trap (500) is operational connected to a field desorption region (570) in which secondary droplets released from the trap are at least partially desolvated or the liquid is evaporated generate even smaller secondary charged droplets or more preferably gas phase ions.

Figure 1E:
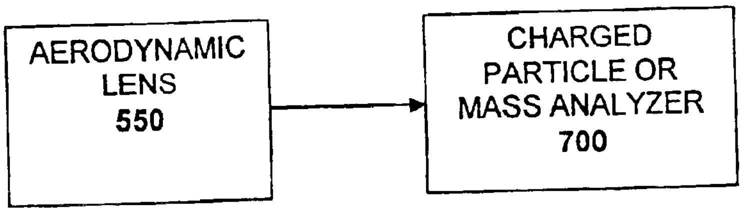
Figure 1F:
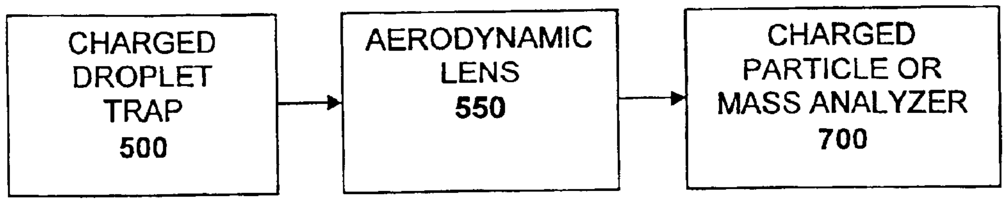

FIG. 1E illustrates a device configuration for high efficiency transport of gas phase ions to a charged particle analyzer or a mass analyzer (700). In this configuration an aerodynamic lens (550) is operationally connected to a charged particle or mass analyzer (700). In this configuration, gas phase ions are conveyed to the analyzer to identify, detect and/or optionally quantify chemical species. In this configuration gas phase ions or charged droplets are introduced into the aerodynamic lens from any art-known source of charged droplets or gas phase ions. FIG. 1F illustrates a more specific device configuration for high efficiency transport of gas phase ions to a charged particle analyzer or a mass analyzer in which secondary charged droplets or gas phase ions are introduced into the aerodynamic lens from a charged droplet trap (500).

Figure 1G:
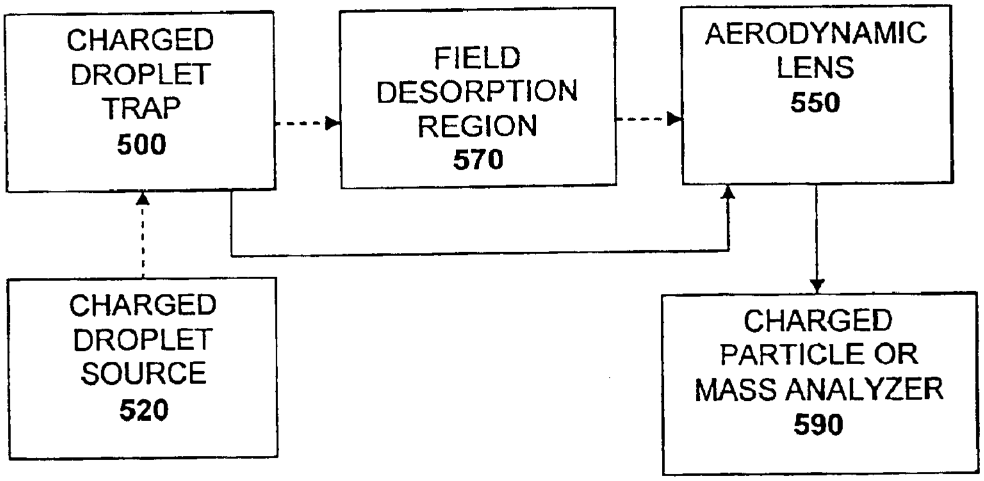

FIG. 1G illustrates a device configuration for analysis of chemical species in a liquid sample from which charged droplets are generated. In this figure dashed arrows indicate optional device elements. Droplets can be introduced in the charged droplet trap for example from a charged droplet source (520). In addition a field desorption region 570 can be positioned between the charged droplet trap and the aerodynamic lens. Secondary charged droplets released from the droplet trap can be at least partially desolvated or more preferably fully desolvated in this region.

Figure 2:
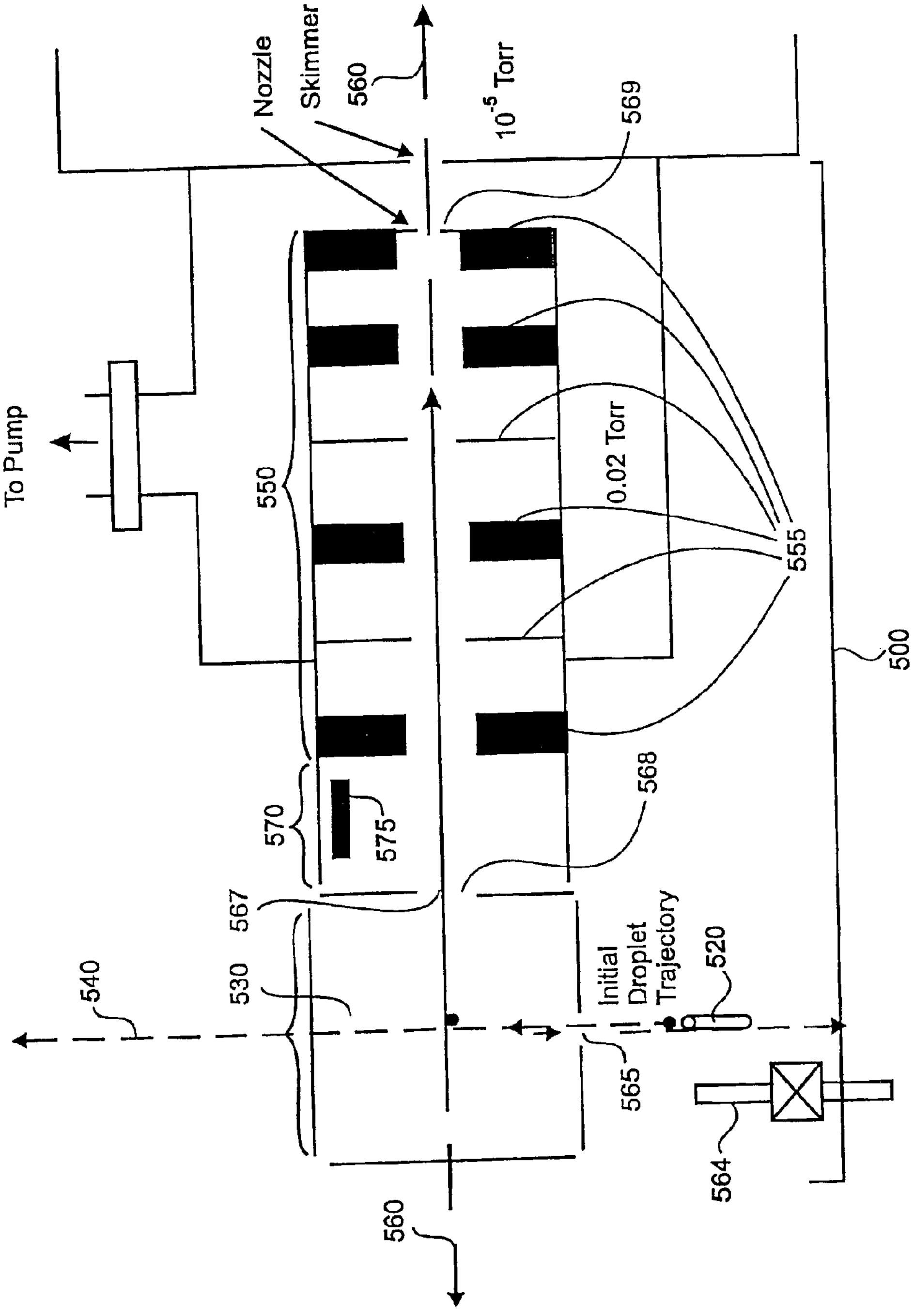
FIG. 2 is a schematic illustration of an exemplary device of the present invention in which a charged droplet trap and aerodynamic lens are combined in a mass spectrometer.

FIG. 2 illustrates an exemplary embodiment of the ion source of the present invention and its application in a mass spectrometer. The illustrated ion source (500) consists of an electrically charged droplet source (520) that is in fluid communication with a charged droplet trap (530) that is positioned a selected distance along a droplet production axis (540). Charge droplet trap (530) has an inlet aperture (565) along droplet production axis (540) for receiving primary electrically charged droplets and an exit aperture (567) along an ion production axis (560). Charged droplet source (520) and charged trap (530) are also in fluid communication with flow inlet (564), which is equipped with flow rate controller, capable of selecting the flow rate of bath gas through charged droplet trap (530).

To generate ions, charged droplet source (520) generates a primary electrically charged droplet from a liquid solution containing chemical species in a solvent, carrier liquid or both. The primary electrically charged droplet is entrained in a flow of bath gas (545), originating from flow inlet (564), that carries the primary electrically charged droplet along droplet production axis (540), through inlet aperture (565), and into charge droplet trap (530). The primary electrically charged droplet is held in charged droplet trap (530) for a selected residence time. At least partial evaporation or desolvation of solvent, carrier liquid or both from the primary electrically charged droplet within the charged droplet trap generates at least one secondary droplet of selected size and gas phase ions. At a selected release time, secondary droplets of a selected size, gas phase ions or both exit charged droplet trap (530) through exit aperture (567). The secondary droplets of a selected size, gas phase ions or both are carrier along ion production axis (560) through a field desorption region (570), positioned along ion production axis (560) where at least partial evaporation or desolvation of solvent, carrier liquid or both from the secondary droplets of a selected size generates gas phase ions.

The ion source of the present invention is capable of operation in two distinct modes: single ion mode and multiple ion mode. In single ion mode, the concentrations of chemical species in the liquid sample are such that the primary electrically charged droplet contains on average either one or zero chemical species a solvent, carrier liquid or both. For example, a droplet 32 microns in diameter will have a volume of 0.014 $\mu$l and, thus, the liquid sample contains one chemical species per 0.014 $\mu$l of solvent, carrier liquid or both. This corresponds to a concentration of 0.12 femtomolar. It should be recognized by anyone skilled in the art that other primary electrically charged droplet sizes and corresponding concentrations of chemical species may be used for this application of the ion source of the presenting invention.

In single ion mode, a primary electrically charged droplet, is generated, retained in the charged droplet trap for a selected residence time and released at a selected release time. Specifically, the primary electrically charged droplet is held in the dcharged droplet trap until it has been reduced to a selected diameter, preferably 0.1 micron, by evaporation and/or desolvation, at which point it will exit the charged droplet trap as a secondary charged droplet of selected size. It is believed that chemical species with molecular masses greater then approximately 3,300 amu will remain in the secondary electrically charged droplet until complete desolvation has occurred. In contrast, chemical species with molecular masses less then approximately 3,300 amu are believed to undergo desorption and ionization from the secondary electrically charged droplet. In a preferred embodiment, ion formation occurs in the field desorption region, preferrably in the aerodynamic lens system, regardless of whether gas phase ions are formed via complete evaporation and/or desolution or desorption and ionization. Accordingly, operation of the ion source of the present invention in single ion mode results in the formation of a single gas phase ion per each primary electrically charged droplet generated. Ion sources operating in single ion mode may be operated to generate discrete gas phase ions at selected, uniform repetition rate or operated to generate discrete gas phase ions at a selected, non-uniform repetition rate. Preferably, the time of ion formation may be selected by controlling the rate of evaporation and/or desolvation of solvent, carrier liquid or both from the primary and/or secondary droplets. The ability to select the ion formation time is beneficial because it allows for efficient synchronization of ion formation events with subsequent mass analysis and detection.

In addition to operating as a source of single gas phase ions, the ion source of the present invention may also be used to generate a plurality of gas phase ions from a single primary electrically charged droplet. In the multiple ion mode, concentration conditions of the liquid sample are selected such that each primary electrically charged droplet contains a plurality of chemical species in a solvent, carrier liquid or both. In this mode of operation, a plurality of gas phase ions are generated upon at least partial evaporation of solvent carrier liquid or both from each primary electrically charged droplet generated. Ion sources operating in multiple ion mode may be operated to generate discrete packets of gas phase ions at a selected, uniform repetition rate or operated to generate discrete packets of gas phase ions at a selected, non-uniform repetition rate.

Optionally, the ion source of the present invention may include an aerodynamic lens system (550), as illustrated in FIG. 2, in fluid communication with charged droplet trap (530), positioned a selected distance from charged droplet trap (530) along the ion production axis (560). Aerodynamic lens system (550) has an internal end (568) for receiving gas phase ions, secondary electrically charged droplets of selected size or both generated from charge droplet trap (530) and an external end (569) from which gas phase ions exit the lens system. In an exemplary embodiment, aerodynamic lens system (550) comprises a plurality of apertures (555) concentrically positioned about ion production axis (560) at selected distances from electrically charged droplet trap (530).

Gas phase ions and secondary electrically charged droplets of a selected size exit charge droplet trap (530) and are carried by the flow of bath gas along ion production axis (560), enter internal end and are passed through aerodynamic lens system (550). At least partial evaporation or desolvation of solvent, carrier liquid or both from the secondary droplets of selected size in the aerodynamic lens system generates gas phase ions. The flow of gas through aerodynamic lens system (550) focuses the spatial distribution of gas phase ions and secondary droplets about ion production axis (560). Gas phase ions, secondary droplets or both exit the external end of aerodynamic lens system at a selected exit time. In a preferred embodiment, gas phase ions exit the aerodynamic lens system (550) with a momentum substantially directed along ion production axis (560). In a more preferred embodiment, gas phase ions exit the aerodynamic lens system (550) with a well-defined, substantially uniform trajectory and, preferably, a substantially uniform velocity.

In another exemplary embodiment, a charge reduction region (570) is optionally positioned at a selected distance between charged droplet trap (530) and aerodynamic lens system (550) along ion production axis (560). The charge reduction region (570) is in fluid connection with both charged droplet trap (530) and aerodynamic lens system (550) and houses a shielded reagent ion source (575), which generates electrons, reagent ions or both from the bath gas. In this embodiment, secondary charged droplets of selected size, gas phase ions or both exit the charged droplet trap and are conducted through charge reduction region (570). Within charge reduction region (570) electrons, reagent ions or both react with the secondary droplets, gas phase analyte ions or both to reduce the charge state distribution of the gas phase analyte ions. Gas phase analyte ion, secondary charged droplets or both exit charge reduction region (570) and are conducted through aerodynamic lens system by the flow of bath gas. In a preferable, embodiment, the charge state distribution of the gas phase analyte ions is selectively adjustable by controlling the concentration of reagent ions within the charge reduction region and/or the residence time of secondary droplets of select size, gas phase analyte ions or both in the charge reduction region.

In the ion source of the present invention, the electrically charged droplet source (520) can be any means of generating electrically charged droplets from liquid samples containing chemical species in a solvent, carrier liquid or both. In a preferred embodiment, the electrically charged droplet source generates a primary electrically charged droplet with a momentum substantial directed along droplet production axis (540). Formation of primary electrically charged droplets with a momentum substantially directed along droplet production axis (540) is desirable because it increase the efficiency of capture of the primary electrically charged droplet by the charged droplet trap.

While primary electrically charged droplets of any size are useable in the present invention, droplets ranging from about 1 to about 50 microns in diameter are preferred because they are efficiently transported by a flow of bath gas. In a more preferred embodiment, the primary electrically charged droplets are substantially uniform in diameter and substantially uniform in velocity. Uniformity of primary electrically charged droplet diameter is desirable because it provides substantially reproducible ion formation times, which may be used in synchronizing ion formation, mass analysis and detection processes.

In a preferred embodiment, electrically charged droplet source (520) comprises a piezoelectric droplet source, for example as illustrated in concurrently filed, commonly owned U.S. patent application Ser. No. 10/113,956, as well as in U.S. provisional application 60/280,632, filed Mar. 29, 2001. In an exemplary embodiment, the electrically charged droplet source comprises a piezoelectric element with an axial bore having an internal end and an external end. Within the axial bore is a dispenser element for introducing a liquid sample held at a selected electric potential. The dispenser element has an inlet end that extends a selected distance past the internal end of the axial bore and a dispensing end that extends a select distance past the external end of the axial bore. The external end of the dispensing tube terminates at a small aperture opening, which is positioned directly opposite a grounded element. The electric potential of the liquid sample is maintained at selected electric potential by placing the liquid sample in contact with an electrode. The electrode is substantially surrounded by a shield element that substantially prevents the electric field, electromagnetic field or both generated from the electrode from interacting with the piezoelectric element.

In this preferred exemplary embodiment, primary electrically charged droplets are generated from the liquid sample upon the application of a selected pulsed electric potential to the piezoelectric element, which generates a pulsed pressure wave within the axial bore. In a preferred embodiment, the pulsed pressure wave is a pulsed radially contracting pressure wave. The amplitude and temporal characteristics, including the onset time, frequency, amplitude, rise time and fall time, of the pulsed electric potential is selectively adjustable by a piezoelectric controller operationally connected to the piezoelectric element. In turn, the temporal characteristics and amplitude of the pulsed electric potential control the onset time, frequency, amplitude, rise time fall time and duration of the pressure wave created within the axial bore. The pulsed pressure wave is conveyed through the dispenser element and creates a shock wave in a liquid sample in the dispenser element. This shock wave results in a pressure fluctuation in the liquid sample that generates primary electrically charged droplets.

In another exemplary embodiment, the electrically charged droplet source comprises a piezoelectric source with continuous droplet production by Rayleigh breakup of a liquid jet capable of internal or external charging. Other electrically charged droplets useable in the present invention include, but are not limited to, electrospray ionization sources, nanospray sources, pusled nanospray sources, pneumatic nebulizers, piezoelectric pneumatic nebulizers, atomizers, ultrasonic nebulizers and cylindrical capacitor electrospray sources.

Any charged droplet trap is useable in the present invention that is capable of holding a primary charged droplet for a select residence time. Charged droplet traps capable of directing the exit trajectories of secondary droplets of selected size and/or gas phase ions are preferred because such traps provide an output comprising secondary droplets and/or gas phase ions with directed momentum along the ion production axis. Production of secondary droplets of selected size and/or gas phase ions with directed momentum along the ion production axis is beneficial because is reduces the loss of ions and droplets to the walls of the apparatus and ultimately provides increase ion transmission efficiency, particularly to a mass analysis region. In addition, a substantially uniform trajectory of gas phase ions and secondary electrically charged droplets of selected size provides reproducible transit times to a mass analysis region, which allows for efficient synchronization of ion formation, mass analysis and detection processes.

In a preferred embodiment, the charged droplet trap of the ion source of the present invention comprises a cubic electrodynamic trap. In a more preferred embodiment, the cubic trap is composed of three sets of opposed planar electrodes. Each set of planar electrodes is driven by an AC voltage, which is 120° out of phase with the other two. Alternatively, two sets of planar electrodes may be driven 60° out of phase while the third set is held at ground. In either case, a dc potential may be simultaneously applied to the two electrodes making up an electrode pair allowing for generation of a balance force between the plates. Each plate in the electrode pair is driven with the same ac signal. In a preferred embodiment, a combination of frequency and amplitude of the AC signal is chosen such that the primary electrically charged droplet is retained in the charged droplet trap until it has evaporated to a size where upon release it would completely desolvate prior to subsequent mass analysis. In an exemplary embodiment, the primary electrically charged droplet is retained until it reaches a diameter less than about 0.1 micron.

Preferred cubic trap dimensions are about 2.5 cm on a side. More preferable, each side of the cube is composed of planar electrodes that are about 2 cm by about 2 cm in dimension and are bordered by an insulating strip about 2 mm wide. A hole may be placed in the center of one or more of the planar electrodes to provide an inlet aperture (565) and exit aperture (567). In a preferred embodiment, a 2 mm diameter hole is placed in the center of each planar electrode to allow access into the cube. Further, holes may be provided on the planar electrodes to allow droplet monitoring by optical or acoustical techniques well known in the art. Preferred planar electrodes are composed of gold vapor deposited on glass.

In another preferred embodiment, the charged droplet trap is designed to allow droplet tracking and monitoring of the primary electrically charged droplet by light scattering. In an exemplary embodiment, the primary droplet is illuminated with 663 nm laser light translating through an open area between adjacent electrodes. Scattered light, of at least one scatter angle, is collected and collimated by a pair of short focal length achromatic lenses. Transparent or semitransparent charge droplet traps may be used to facilitate efficient droplet illumination and collection of scattered laser light. Alternatively, the electrodes may be equipped with holes to allow transfer of scattered light at selected scatter angle and efficient collection. The image formed by the lens pair comprises an interference pattern, which can be recorded by a charged coupled device camera. The number of observed fringes are proportional to the size of the primary electrically charged droplet and the rate at which the fringes pass a fixed point is directly proportional to the evaporation and/or desolvation rate of the primary electrically charge droplet in the charged droplet trap. Accordingly, this preferred embodiment provides a means of measuring the diameter of the primary electrically charged droplet and a means of monitoring the rate of evaporation and/or desolvation in the charged droplet trap.

In another preferred embodiment, the charged droplet trap is designed to allow irradiation of trapped droplets with selected wavelengths of light that can impart energy to the droplet which can assist in droplet desolvation or otherwise affect the droplet or the chemical species in the droplet.

Figure 3:
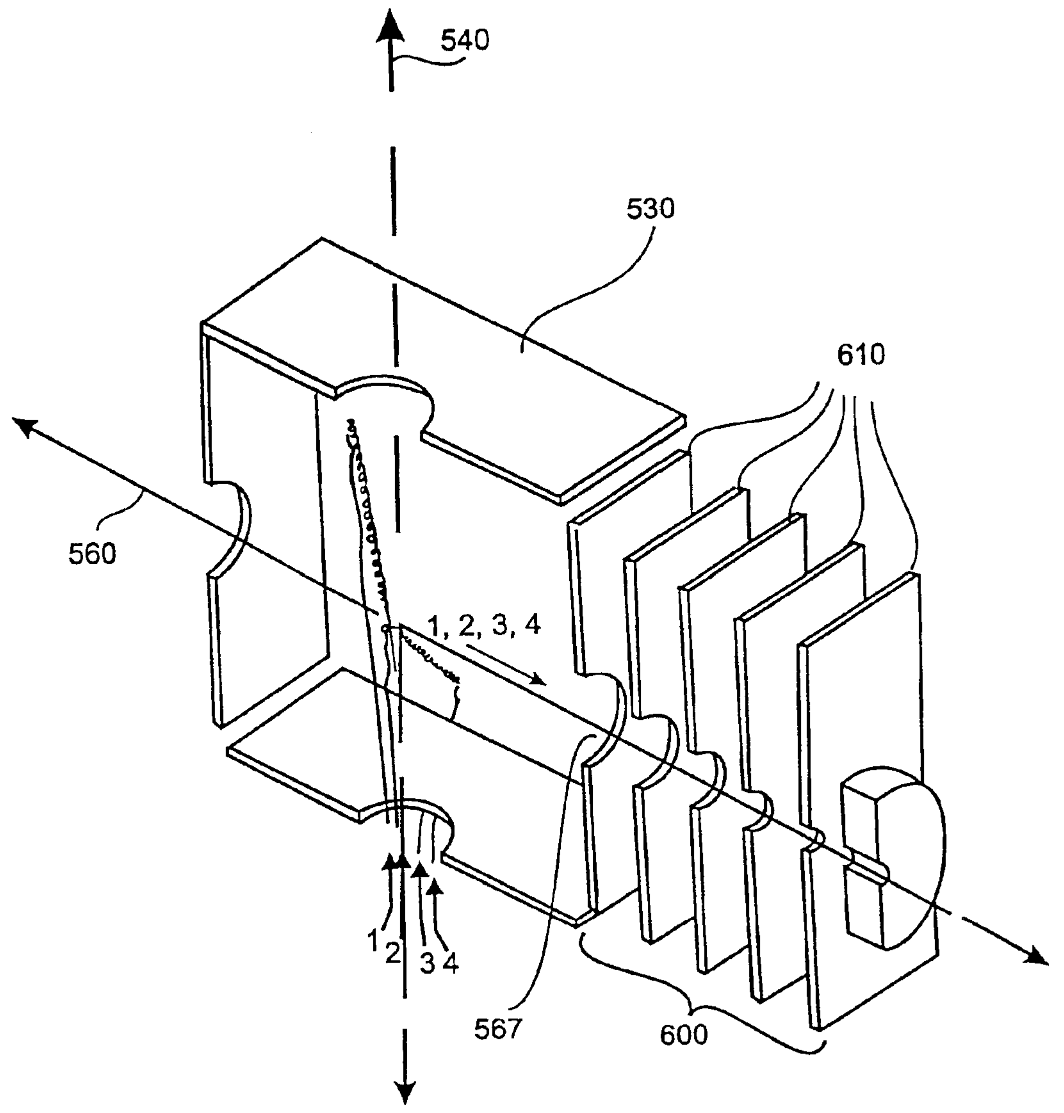
FIG. 3 is a cross-sectional illustration of a charged droplet trap operationally connected to an ion funnel. Simulated trajectories of several droplets entering the cube on four separate paths and with an initial velocity spread of 4 m/s are illustrated. All four droplets are shown in this simulation to quickly reach the center of the cube an exit on the exact same trajectory.

Optionally, the ion source of the present invention may further comprise an ion funnel positioned along the ion production axis and operationally connected to a charged particle trap. In this embodiment of the ion source of the present invention, the ion funnel functions to facilitate the direction of gas phase ions, secondary droplets of a selected size out of the charged droplet trap and along the ion production axis. A preferred ion funnel incorporates a dc potential gradient and a plurality of electrodes of varying diameter, decreasing along the ion production axis. FIG. 3 is a schematic drawing illustrating this exemplary embodiment of the invention and shows charge droplet trap (530) in fluid communication with ion funnel (600). Ion funnel (600) is operationally connected to exit aperture (567) and comprises of a plurality of square stainless steel plates, 2.4 cm square in dimension, having circular apertures drilled in their centers (610). The ac signal applied to the funnel is of the same frequency and magnitude as that applied to exit aperture (567) of the charge droplet trap (530). Additionally, a dc potential gradient is applied across the ion funnel with lower dc potentials the further the ion funnel extends away from the charged droplet trap. It should be recognized that the use of ion funnels to direct the trajectories of charged particles is well known in the art and the preferred and exemplary embodiments describe are but one way of many to construct and use such an ion funnel. Him et al. and Kim et al. describe the devices and method using ion funnels to direct charged particles [Him, T. et al. Analytical Chemistry, 72(10), 2247–2255 (2000), Kim, T. et al. Analytical Chemistry, 72(20), 5014–5019 (2000).

The rate of evaporation or desolvation of the primary electrically charged droplet held in the charged droplet trap is selectably adjustable in the present invention. This can be accomplished by methods well known in the art including but not limited to: (1) heating the electrically charged droplet trap, (2) introducing a flow of dry bath gas to the electrically charged droplet trap, (3) selection of the solvent and/or carrier liquid, (4) selection of the charged state of the charged droplets or (5) combinations of these methods with other methods known in the art. Controlling the rate of evaporation of primary electrically charged droplets provides control over the size and release time of secondary electrically charged droplets and is beneficial because it allows for high efficiency of gas phase ion formation and synchronization of ion formation time and subsequent mass analysis and detection.

Figure 4:
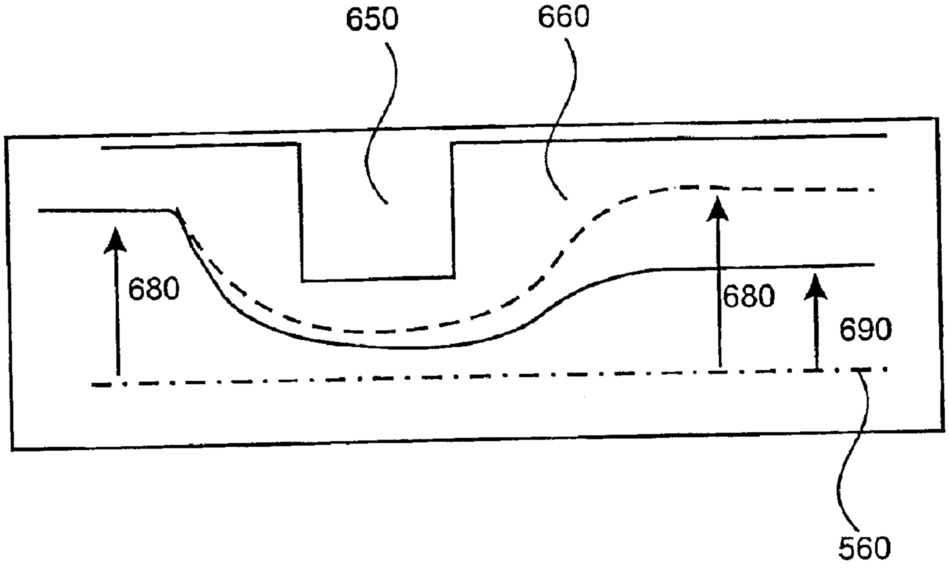
FIG. 4 is a schematic drawing of an aerodynamic lens showing laminar flow (the laminar flow streamline is the dashed line) and the resultant particle trajectory (solid line) through the aerodynamic lens.

The aerodynamic lens of the present invention is an axisymmetric device which first contracts a laminar flow and then lets the laminar flow expand. FIG. 4 shows a cross sectional longitudinal view of an aerodynamic lens system comprising a single aperture (650) placed inside a tube (660), which illustrates the fluid mechanics involved in focusing a stream of particles, preferably secondary electrically charged droplets of selected size and/or gas phase ions, about ion production axis (560). In steady laminar flow, a fluid streamline entering the lens at a radial distance of (680) (where radial distance 680>constriction aperture radius) will compress to pass through aperture (650) and then return to its original radial position (680) at some point downstream of aperture (650). A particle, which enters along this same streamline, will have the same initial starting radius (680). However, due to inertial effects, the particle will not follow the streamline perfectly as it contracts to pass through aperture (650). As a result, down stream of aperture (650) the particle will not return to it initial radial position (680), but instead to some radius (690) which is less than (680). By placing multiple apertures in series it is possible to move or focus the particle arbitrarily close (depending on the number of lenses employed) to ion production axis (560). Contraction factor $\eta$, defined as the ratio of these two radii (690/680), characterizes the degree of focusing experienced in the aerodynamic lens system. $\eta$ is a function of the gas properties which make up the fluid flow, the shape and number of the apertures employed and the aerodynamic size and mass of the particles in the fluid stream. Using an electrospray scanning mobility particle sizer we obtained electrophoretic mobility diameters for single stranded DNA molecules in air (−1 charge state). The diameter of a 20 mer DNA molecule was measured to be ≈0.003 μm while the diameter obtained for a 111 mer DNA was ≈0.005.

In an exemplary embodiment, the aerodynamic lens system of the present invention comprises five separate apertures housed in a cylindrical chamber. Specifically, the aerodynamic lens system of this exemplary embodiment comprises five apertures positioned along the ion production axis and contained within a cylindrical chamber approximately 10 mm in diameter. Each aperture is separated form each other by a distance of 50 mm, as measured from the center of one aperture to an adjacent aperture. Starting with a width of 10 mm at the internal end, the apertures alternate between a width of 0.5 mm and a width of 10 mm along the ion production axis. From internal to external end, the aperture diameter decreases sequentially from 5.0 mm to 4.5 mm to 4.0 mm to 3.75 mm to and 3.5 mm. A modified thin-plate-orifice nozzle consisting of an about 6 mm in diameter cylindrical opening, about 10 mm long, leading to a thin-plate aperture about 3 mm in diameter, is cooperatively connected to the external end of the aerodynamic lens system. Optionally, a bleeder valve may be cooperatively connected to the internal end of the aerodynamic lens stack to adjust the flow rate and flow characteristics of the bath gas, secondary electrically charged particles and gas phase ions through the aerodynamic lens. In a preferred embodiment, the flow velocity through the aerodynamic lens system is selectably adjustable over the range of about 100 m/sec to about 500 m/sec.

In a preferred embodiment, the secondary electrically charged droplets passing through the aerodynamic lens have a substantially uniform size. Secondary electrically charged droplets with substantially uniform size translate through the aerodynamic lens system with substantially uniform velocities. Production of secondary electrically charged droplets with substantially the same velocity is desirable because it allows efficient synchronization between ion formation, mass analysis and detection.

In another embodiment, the aerodynamic lens system of the present invention may be differentially pumped to provide a pressure gradient along the ion production axis. Preferably, the pressure near the internal end is maintained at about 5 Torr and decreases along the ion production axis to a pressure of about 0.01 Torr near the external end. Differential pumping may be provided by a mechanical pump, turbomolecular pump, roots blower or diffusion pump or by any other means of differential pumping known in the art.

The invention also provides methods and devices for identifying the presence of and/or quantifying the abundance of chemical species in liquid samples as illustrated above in FIGS. 1E–G above. In this aspect of the invention, the devices and methods for generating ions from liquid samples containing chemical species in a solvent, carrier liquid or both are cooperatively coupled to a charged particle analyzer, preferably a mass analyzer.

Figure 5:
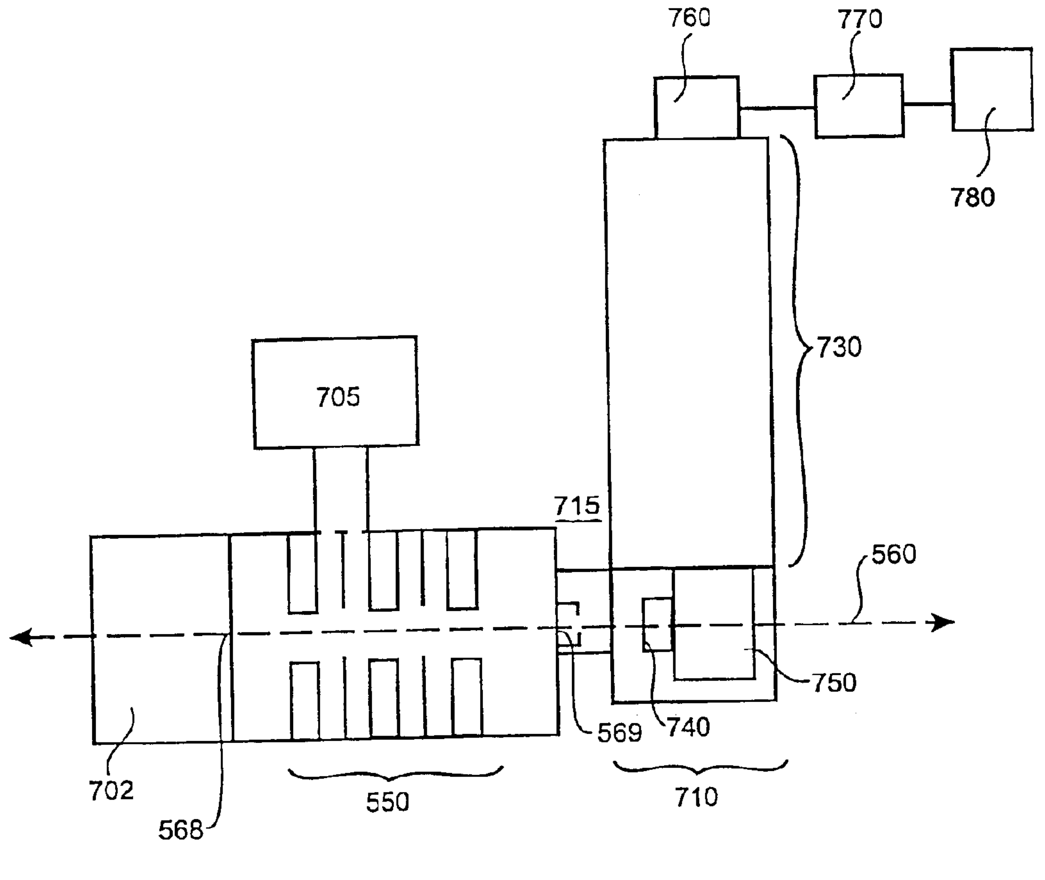
FIG. 5 is a schematic drawing of an ion source of this invention coupled to an orthogonal time of flight mass analyzer.

FIG. 5 depicts a preferred embodiment in which a charged droplet source (702) and aerodynamic lens system (550) are operationally connected to an orthogonal time-of-flight mass spectrometer (710). Gas phase ions form in the aerodynamic lens system (550), are spatially focused along ion production axis (560) and a portion is drawn into an orthogonal time of flight mass spectrometer (710), where the flight tube (730) is positioned orthogonal to the ion production axis (560). In a more preferred embodiment, the mass analyzer is a commercially available PerSeptive Biosystems Mariner orthogonal TOF mass spectrometer with a mass to charge range of approximately 25,000 m/z and an external mass accuracy of greater than 100 ppm.

A modified thin-plate-orifice nozzle (715), consisting of an about 6 mm in diameter cylindrical opening, about 10 mm long, leading to a thin-plate aperture about 3mm in diameter, is cooperatively connected to the external end (569) of the aerodynamic lens system to conduct gas phase ions leaving the aerodynamic lens system into the orthogonal time-of-flight mass spectrometer (710). The aerodynamic lens system (550) is differentially pumped by an intermediate pressure pumping means (705) to provide a pressure gradient between the high-pressure region of the charged droplet source (702) and the low-pressure region of the mass spectrometer. In a preferred embodiment, the internal end (568) is maintained at a pressure of about 5 Torr and the external end (569) is maintained at a pressure of about 0.01 Torr. Accordingly, the aerodynamic lens system provides a sampling interface between the charged droplet source (702) and the orthogonal time of flight mass spectrometer (710) that allows the transport of gas phase ions from atmospheric pressure to the high vacuum ($<1\times10^{-3}$ Torr) region of the mass spectrometer. Use of a aerodynamic lens to transport ions to the mass analysis region of a orthogonal time of flight mass spectrometer is preferred because it provides an improvement in ion transport efficiency of a factor of 1000 over convention ion sampling configurations.

Within orthogonal time of flight mass spectrometer (710), the gas phase ions are focused and expelled into a flight tube (730) by a series of ion optic elements (740) and pulsing electronics (750). In a preferred embodiment, ion formation and pulsed extraction processes are synchronized to achieve a detection efficiency independent on the duty cycle of the orthogonal time-of-flight mass spectrometer. The arrival of ions at the end of the flight tube is detected by a microchannel plate (MCP) detector (760). Although all gas phase ions receive the same kinetic energy upon entering the flight tube, they translate across the length of the flight tube with a velocity inversely proportional to their individual mass to charge ratios (m/z). Accordingly, the arrival times of gas phase ions at the end of the flight tube are related to molecular mass. The output of microchannel detector (760) is measured as a function of time by a 1.3 GHz time-to-digital converter (770) and stored for analysis by microcomputer (780). By techniques known in the art of time of flight mass spectrometry, flight times of gas phase ions are converted to molecular mass using a calibrant of known molecular mass.

The ion source of the present invention is particularly well suited for mass analysis via orthogonal time of flight mass spectrometry. First, the well defined, substantially uniform ion trajectories provided by the ion source substantially decrease the spread in ion positions prior to orthogonal extraction and result in increased resolution of the mass analysis obtained. Second, the method of mass analysis of the invention has a high ion collection efficiency because the ion source of the present invention is capable of providing ions having a momentum substantially directed along the ion production axis that is coaxial with the centerline axis of the orthogonal time of flight mass spectrometer. Finally, because the ion formation and transit times are selectively adjustable and substantially uniform in the present invention ion formation, mass analysis and detection may be synchronized to eliminate any dependence of detection efficiency on the duty cycle of the orthogonal extraction pulse.

Figure 6:
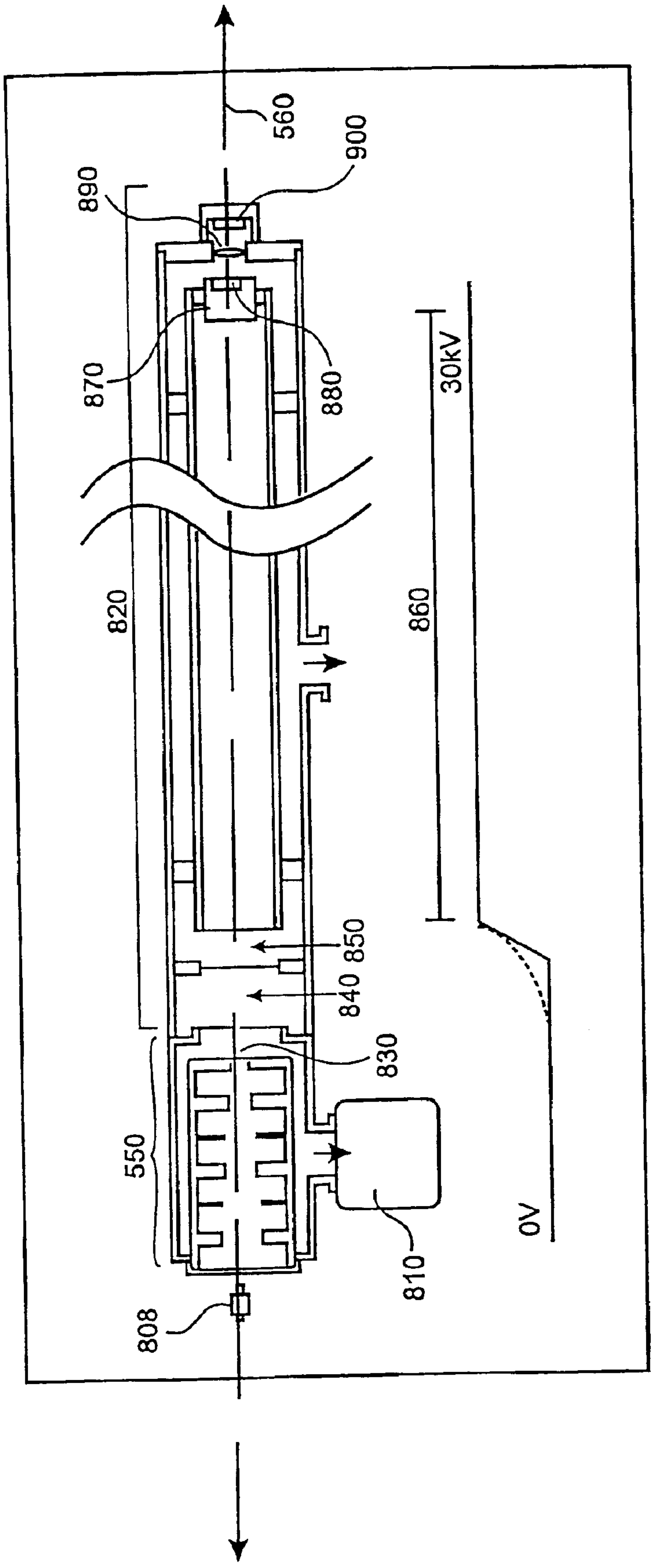
FIG. 6 is a schematic drawing of an ion source of this invention coupled to a mass analyzer.

FIG. 6 depicts another preferred embodiment where an ion source of the present invention comprising a charge droplet source (808) and aerodynamic lens system (550) is operationally coupled to a linear time-of-flight mass spectrometer. In this embodiment, gas phase ions are spatially focused about the ion production axis (560) by an aerodynamic lens system (550) that is differentially pumped by a first stage pump element (810). The ions exit the aerodynamic lens system with velocities parallel to the centerline axis of a linear time-of-flight mass spectrometer (820), which is coaxially oriented with respect to the ion production axis (560). A modified thin-plate-orifice nozzle (830), consisting of an about 6 mm in diameter cylindrical opening, about 10 mm long, leading to a thin-plate aperture about 3mm in diameter, is cooperatively connected to the external end of the aerodynamic lens system to conduct gas phase ions leaving the aerodynamic lens system into the linear time-of-flight mass spectrometer.

The ions enter the mass spectrometer through the in-plate-orifice nozzle (830), and are accelerated and mass analyzed using delayed extraction techniques well known by those skilled in the art of mass spectrometry and related fields. Specifically, the linear time-of-flight mass spectrometer has a first extraction region (840) for extracting ions with a voltage draw-out pulse applied to the field free region and a second extraction region (850) for accelerating the ions to their final flight energies. The ions enter first extraction region (840) while the potential difference in this region is held substantially close to zero. At a selected time later, equal to the average transit time of the ion and/or secondary electrically charged droplet through the aerodynamic lens system and into the acceleration region, a potential difference is placed across the electrodes in the first extraction region (840) to accelerate the gas phase ions. The ions enter the second stage extraction region (850) where ions are further accelerated to their final flight energies.

Gas phase ions enter an electric-field-free flight tube (860) and are detected by a microchannel plate detector (870). Electrons are generated in a microchannel cascade initiated by the impact of an ion with the microchannel plate detector and transfer their energy to a phosphor screen (880) causing it to emit photons. These photons are focused by lens (890) and imaged onto the face of a photodetector (900) referenced to ground. The flight time is then marked by the generation of a signal at the photodetector. By noting the time difference between the application of the potential difference between the acceleration electrodes and the arrival of the particle at the MCP detector a measurement of flight time is obtained.

In a preferred embodiment, high acceleration voltages (>4 kV) are employed to accelerate the gas phase ions. In an exemplary embodiment, an acceleration voltage of 30 kV is applied to the electrodes. Use of high acceleration voltages is desirable because it minimizes the degradation of the resolution attained due to deviation in the pre-acceleration spread of ion kinetic energies. Further, high acceleration voltage is preferred because it results in higher post-acceleration kinetic energies that result in increased detection efficiency of the microchannel plate (MCP) detector.

The ion source of the present invention is especially well suited for analysis via linear time-of-flight mass spectrometry using delayed extraction because the ion source provides ions with minimized spread in initial ion start positions (initial ion start position is the position of ions between electrodes when the acceleration is applied) and minimized variation in gas phase ion velocities prior to acceleration. The method of mass analysis of the invention has a high ion collection efficiency because the ion source of the present invention is capable of providing ions having a momentum substantially directed along the ion production axis that is coaxial with the centerline of the mass spectrometer. Increases in detection efficiency, over convention mass spectrometers, up to a factor of $10^{12}$ can be achieved by the method of mass analysis in the present invention. Accordingly, the method of mass analysis combining the ion source of the present invention and linear time-of-flight mass spectrometry provides very high resolution and sensitivity.

It should be recognized that the method of ion production, classification and detection employed in the present invention is not limited to analysis via TOF-MS and is readily adaptable to virtually any mass analyzer. Accordingly, any other means of determining the mass to charge ratio of the gas phase analytes may be substituted in the place of the time of flight mass spectrometer. Other applicable mass analyzers include but are not limited to quadrupole mass spectrometers, tandem mass spectrometers, ion traps and magnetic sector mass analyzers. However, an orthogonal TOF analyzer is preferred because it is capable of measurement of m/z ratios over a very wide range that includes detection of ions up to approximately 30,000 Daltons. Accordingly, TOF detection is well suited for the analysis of ions prepared from liquid solution containing macromolecule analytes such as protein and nucleic acid samples.

It should also be recognized that the ion production method of the present invention may be utilized in sample identification and quantitative analysis applications employing charged particle analyzers other than mass analyzers. Ion sources of the present invention may be used to prepare ions for analysis by electrophoretic mobility analyzers. In an exemplary embodiment, a differential mobility analyzer is operationally coupled to the ion source of the present invention to provide analyte ion classification by electrophoretic mobility. In particular, such applications are beneficial because they allow ions of the same mass to be distinguished on the basis of their molecular structure.

FIG. 1E illustrates another aspect of the invention. Aerodynamic lens system (550) is operational connected to charged particle analyzer or mass analyzer (700) to provide a method of transmitting gas phase ions to an analysis region. In an exemplary embodiment, aerodynamic lens system (550) is differentially pumped to provide an efficient means of transporting charged particles from a high-pressure region to a low-pressure region with minimal loss of charge particles. In a preferred embodiment, aerodynamic lens system (550) provides a preferred sampling interface because it spatial focuses secondary charged droplets and gas phase ions about an ion production axis, which may be oriented coaxial with the centerline axis of a mass analysis region. In a more preferred embodiment, aerodynamic lens system (550) provides a sampling interface capable of delivering a stream of gas phase ions to a mass analysis region, where the gas phase ions travel along a well-defined, substantially uniform trajectory and have substantially uniform velocities. The properties of the aerodynamic lens system of the present invention are such that it can be used to replace the nozzle, skimmer and/or collisional cooling chamber employed in conventional mass spectrometers. Specifically, substituting the aerodynamic lens system of the present invention for the sampling interface on a standard orthogonal TOF instrument is capable of improving the transport efficiency of ions into the mass spectrometer by at least 3 orders of magnitude.

Further, the devices and ion production methods of this invention may be use to prepare charged droplets, gas phase ions or both for coupling to surfaces and/or other target destinations. For example, surface deposition may be accomplished by positioning a suitable substrate downstream of the ion source of the present invention along the ion production axis and in the pathway of the stream of charged droplets and/or gas phase ions. The substrate may be grounded or electrically biased whereby charged droplets and/or gas phase ions are attracted to the substrate surface. In addition, the stream of charged droplets and/or gas phase ions may be directed, accelerated or decelerated using ion optics known by persons of ordinary skill in the art. Upon deposition, the substrate may be removed and analyzed via surface and/or bulk sensitive techniques such as atomic force microscopy, scanning tunneling microscopy or transmission electron microscopy. Similarly, the present devices, charged droplet preparation methods and ion preparation methods may be used to introduce chemical species into cellular media. For example, charged oligopeptides and/or oligonucleotides prepared by the present methods may be directed toward cell surfaces, accelerated or decelerated and introduced in one or more target cells by ballistic techniques known to those of ordinary skill in the art.

The present invention provides a means of generating gas phase ions from liquid samples containing biopolymers in a solvent, carrier liquid or both. In addition, the methods and devices of the present invention provide sources of gas phase ions having a momentum substantially direct along an ion production axis, preferably with well-defined, substantially uniform trajectories and substantially uniform velocities. The invention provides exemplary ion sources for the identification and quantification of high molecular weight compounds in liquid samples via analysis with a mass analyzer or any equivalent charged particle analyzer. These and other variations of the present charged droplet and ion sources are within the spirit and scope of the claimed invention. Accordingly, it must be understood that the detailed description, preferred embodiments and drawings set forth here are intended as illustrative only and in no way represent a limitation on the scope and spirit of the invention.

THE EXAMPLES

Example 1

Numerical Modeling of the Electrodynamic Trap

In order to delineating the basic parameters of the cubic trap used in the present invention the generalized equations of motion for a particle inside the trap, taking into account gravity and viscous drag forces, were evaluated. The motion along one dimension is independent of the other two, allowing the generalized equation of motion to be represented as a scalar:

$$\ddot{u}+\frac{6\pi\eta r}{m}\dot{u}-\frac{q}{m}E_u=0$$

where u may be replaced by any of the three axial displacement variables x, y, and z, $E_u$ is the time varying (ac) component of the electric field, η is the viscosity of the medium in which the particle is immersed and r is the radius of the droplet. The simplified expression for the electric field inside the cube, which is accurate only near the center of the cube, is:

$$E_u=\frac{8.3212}{a}\left(\frac{u}{a}-\frac{1}{2}\right)V_{ac}\cos(\omega t)$$

where a is the edge length and $V_{ac}$ is the peak amplitude of the ac voltage. Combining the above two equations and making the following change of variables:

$$U=u-\frac{a}{2},\ \omega t=2\tau,\ 2K=\frac{12\pi\eta r}{\omega m},\ 2Q=\frac{33.2848qV_{ac}}{m\omega^2a^2}$$

allows the equation of motion to be written as:

$$\frac{d^2U}{d\tau}+2K\frac{dU}{d\tau}-2Q[\cos(2\tau)]U=0$$

which is a damped form of the Mathieu differential equation. Th is particular differential equation also describes the motion of an ion in a multipole ion trap. A droplet in a cubic trap at atmospheric pressure will, therefore, behave very much like an ion in a multipole ion trap at low pressure. This means that for a droplet of a given size there will be combinations of frequencies and amplitudes of the applied ac signal which will provide solutions to the above equation, referred to as regions of stability (the droplet will be trapped) and combinations which will not provide a proper solution, referred to as regions of instability (the droplet is not trapped). Accordingly, there will be a range of droplet sizes that will be trapped for a fixed frequency and amplitude of the applied ac signal.

For a numerical simulation, a combination of frequency and amplitude of the ac signal were used that trap a typical droplet generated by the electrically charged droplet source of the present invention and retain it until it has evaporated to a point where upon release it would completely desolvate before entering the mass analyzer.

The electrodynamic properties of the cubic trap were numerically modeled. This permits the effects of the dc balance forces and of interactions with a gas counterflow to be determined. In employing the cubic trap, introduction of the droplet vertically through the bottom and exit through one of the cube sides is preferable. To achieve this orientation a horizontal counterflow of gas was used. The force exerted on the droplet by the gas is offset by an opposed dc potential.

Trapping the droplet requires that the conditions inside the cube be such that the trajectory of the droplet is stable (i.e. a solution is obtained for the equation of motion). In implementing the cubic trap for our ion source, the motion in both the vertical and horizontal (perpendicular to the axis containing the exit aperture) directions is kept damped, thereby confining the motion of the droplet to the axis of exit.

Another requirement of the charged droplet trap of this exemplary embodiment is that when the droplet reaches the desired diameter, its trajectory must no longer be stable along the exit axis, causing it to leave the trap. The viscous drag due to the gas flow along the exit axis in combination with a dc potential along this axis permits control of when the droplet exits the trap. Examining the two forces, which act along the exit axis, viscous gas force and electrostatic force, reveals that there is only a single diameter at which the two forces will be exactly balanced. This is the diameter for which the droplet will sit precisely in the center of the trap. At all other times the droplet will be oscillating in the trap.

The location of the center of oscillation depends on the magnitude and direction of the force imbalance. The further the center of oscillation is from the trap center the larger the amplitude of the oscillation. As the imbalance between the two forces increases, the center of oscillation moves further and further from the trap center, until the oscillation becomes unstable and the droplet exits the trap. Finally, if there were no viscous drag force from a background gas, a droplet with enough energy to enter a cubic trap (with an active ac signal) will also have enough energy to exit the trap. However, the viscous drag force, due to the air molecules, removes energy from the droplet, permitting us to obtain a stable trajectory inside the trap.

A Simion model of the ion trajectories was developed which includes both the electrodynamics and electrostatics of the cubic trap along with the viscous drag force due to the gas flow. In this model, the droplet enters the bottom of the trap and spends a majority of its time near the center of the trap. Simion allows the user to define electrodes onto which electric and/or magnetic potentials may be applied. From the electrode placement, Simion numerically solves Laplace's equations for the areas between and around the electrodes, thus determining the electric field. From this it is able to calculate the forces acting on a charged particle as it moves through the region, determining an accurate trajectory for the particle. In addition, Simion allows the user to implement a Monte Carlo approach to determining the particle's trajectory, enabling the effect of other forces, such as viscous drag, gravity, collisions etc. to be modeled.

By using this simulation, it was determined that an ac signal of 1700 V peak amplitude and 400 Hz frequency combined with a 20 ml/sec gas flow and 50 V dc potential on the electrode pair located on the exit axis provided the required trapping conditions, confining the droplet until a minimum size of 0.1 microns is reached. This configuration has the desirable characteristic that no feedback of any type is required to levitate the droplet nor is it necessary to adjust any of the voltages to eject the droplet from the trap. The cubic trap modeled is 24.0 mm in dimensions. Each side of the cube is composed of a 2 cm by 2 cm electrode that is bordered by a 2 mm wide insulating strip. A 2 mm diameter hole is placed in the center of each plate to allow cube access.

All references cited in this application are hereby incorporated in their entireties by reference herein to the extent that they are not inconsistent with the disclosure in this application. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques specifically described herein are intended to be encompassed by this invention.

We claim:

1. A charged particle source for preparing secondary electrically charged droplets having a selected size both from a liquid sample, containing chemical species in a solvent, carrier liquid or both, said source comprising:

a) an electrically charged droplet source for generating a primary electrically charged droplet of the liquid sample in a flow of bath gas, wherein said primary electrically charged droplet has a selected droplet exit time and a momentum substantially directed along a droplet production axis;

b) a charged droplet trap in fluid communication with the electrically charged droplet source and positioned along said droplet production axis at a selected distance downstream from said electrically charged droplet source, with respect to the flow of bath gas, for receiving the flow of bath gas and primary electrically charged droplet; wherein the primary electrically charged droplet remains in the charged droplet trap for a selected residence time sufficient to provide partial evaporation of solvent, carrier liquid or both from the primary electrically charged droplet generating at least one secondary electrically charged droplet having said a selected size; wherein the secondary electrically charged droplets having said a selected size exit the trap along an ion production axis at a selected release time; and c) at least one flow inlet in fluid communication with said charged droplet source for introducing a flow of bath gas.

2. The charged particle source of claim 1 wherein the secondary electrically charged droplets having said a selected size have a momentum substantially directed along the ion production axis.

3. The charged particle source of claim 1 wherein the secondary electrically charged droplets having said a selected size have a substantially uniform trajectory along the ion production axis.

4. The charged particle source of claim 1 wherein the temperature in the charged droplet trap is selectably adjustable.

5. The charged particle source of claim 1 comprising a flow rate controller which is capable of adjusting the flow rate of bath gas through the charged droplet trap.

6. The charged particle source of claim 1 wherein the temperature of the charged droplet trap, the flow rate of bath gas through the charged droplet trap, the charge state of the primary electrically charged droplet or any combination thereof is adjusted to control the rate of evaporation of solvent, carrier liquid or both from the primary electrically charged droplets.

7. The charged particle source of claim 1 wherein the charged droplet trap is selected from the group consisting of:

an electrostatic droplet trap;

an electrodynamic droplet trap;

a magnetic droplet trap;

an optical droplet trap; and an acoustical droplet trap.

8. The charged particle source of claim 1 wherein the charged droplet trap comprises a cubic trap.

9. The charged particle source of claim 8 wherein the cubic trap comprises a first pair of opposed planar electrodes, a second pair of opposed planar electrodes and a third pair of opposed planar electrodes, wherein said first pair of opposed planar electrodes, said second pair of opposed planar electrodes and said third pair of opposed planar electrodes are arranged in a cubic orientation.

10. The charged particle source of claim 9 wherein the first pair of opposed planar electrodes are in contact with an ac voltage which is 120° out of phase with the second pair of opposed planar electrodes and the third pair of opposed planar electrodes and wherein the second pair of opposed planar electrodes are in contact with an ac voltage which is 120° out of phase with the first pair of opposed planar electrodes and the third pair of opposed planar electrodes.

11. The charged particle source of claim 9 wherein the first pair of opposed planar electrodes is in contact with an ac voltage that is 60° out of phase with the second pair of opposed electrodes and the third pair of opposed planar electrode is held substantially near ground.

12. The charged particle source of claim 9 wherein a dc potential is simultaneously applied to the planar electrodes to allow generation of a balance force between the plates.

13. The charged particle source of claim 9 wherein the planar electrodes comprise gold vapor deposited on glass.

14. The charged particle source of claim 9 wherein at least one planar electrode has a central orifice.

15. The charged particle source of claim 1 wherein the charged droplet trap has an inlet aperture and an exit aperture.

16. The charged particle source of claim 1 comprising a charge reduction region, of selected length, having a shielded reagent ion source which generates electrons, reagent ions or both from said bath gas, cooperatively connected to the electrically charged droplet source and positioned a selected distance downstream with respect to the flow of bath gas from said dropret source for receiving the flow of bath gas, electrically charged droplets, gas phase ions or any combinations of these, wherein at least partial evaporation of solvent, carrier liquid or both from the electrically charged droplets generates gas phase ions, wherein the electrons, reagent ions or both react with the electrically charged droplets, gas phase ions or both to reduce the charge state distribution of the gas phase ions and generate gas phase ions with a selected charge state distribution.

17. The charged particle source of claim 1 wherein a single gas phase ion is generated from the primary electrically charged droplet.

18. The charged particle source of claim 1 wherein a plurality of gas phase ions is generated from the primary electrically charged droplet.

19. The charged particle source of claim 1 wherein the primary electrically charged droplet contains a single chemical species.

20. The charged particle source of claim 1 comprising an ion funnel operationally connected to said charged droplet trap.

21. The charged particle source of claim 1 wherein the secondary electrically charged droplets having said selected size have a substantially uniform velocity.

22. The charged particle source of claim 1 wherein the droplet production axis is coaxial with the ion production axis.

23. The charged particle source of claim 1 wherein the primary electrically charged droplet and secondary electrically charged droplets are positively charged.

24. The charged particle source of claim 1 wherein the primary electrically charged droplet and secondary electrically charged droplets are negatively charged.

25. The charged particle source of claim 1 wherein the primary electrically charged droplet has a volume of 10 picoliters and the concentration of said chemical species in said liquid sample is less than or equal to about 20 picomoles per liter.

26. The charged particle source of claim 1 wherein the electrically charged droplet source is a piezoelectric droplet source.

27. The charged particle source of claim 1 wherein the electrically charged droplet source comprises:

a) a piezoelectric element with an axial bore, positioned along the droplet production axis, having an internal end and an external end, wherein said piezoelectric element is capable of generating a pulsed pressure wave within the axial bore upon application of a pulsed electric potential to the piezoelectric element;

b) a dispenser element positioned within the axial bore of said piezoelectric element, wherein the dispenser element extends a selected distance past the external end of the axial bore and terminates at a dispensing end with a small aperture opening, wherein the dispenser element extends a selected distance past the internal end of the axial bore and terminates at an inlet end for introducing liquid sample and wherein said pulsed pressure wave is conveyed through said dispenser element and generates primary electrically charged droplets of the liquid sample that exit the dispensing end at a selected droplet exit time;

c) an electrode in contact with said liquid sample which is capable of holding said liquid sample at a selected electric potential;

d) a shield element positioned between said electrode and said piezoelectric element for substantially preventing the electric field, electromagnetic field or both generated from said electrode from interacting with said piezoelectric element; and e) a piezoelectric controller operationally connected to said piezoelectric element capable of adjusting the onset time, frequency, amplitude, rise time, fall time and duration of the pulsed electric potential applied to the piezoelectric element which selects the onset time, frequency, amplitude, rise time, fall time and duration of the pulsed pressure wave within the axial bore.

28. The charged particle source of claim 1 wherein said chemical species are biopolymers.

29. The charged particle source of claim 1 wherein said chemical species are selected from the group consisting of:

one or more oligopeptides;

one or more oligonucleotides;

one or more lipids;

one or more glycoproteins;

one or more polysaccharides; and one or more carbohydrates.

30. The charged particle source of claim 1 comprising an online liquid phase separation device operationally connected to said electrically charged droplet source to provide sample purification, separation or both prior to formation of said primary electrically charged droplets.

31. The charged particle source of claim 30 wherein said online liquid phase separation device is selected from the group consisting of:

a high performance liquid chromatography device;

a capillary electrophoresis device;

a microfiltration device;

a flow sorting device;

a liquid phase chromatography device; and a super critical fluid chromatography device.

32. The charged particle source of claim 1 comprising:

a) a light source for illuminating the primary electrically charged droplet held in the charged droplet trap; and b) a scattered light detector positioned at a selected scattered light angle for detecting light scattered by said primary electrically charged droplet held in the charged droplet trap;

wherein monitoring the intensity of light scattered from said primary electrically charged droplet provides measurement the size of the primary electrically charged droplet, the rate of evaporation of solvent, carrier liquid or both from the primary electrically charged droplet, or both.

33. A charged particle source for preparing charged particles from a liquid sample, said charged particle source comprising a primary electrically charged droplet of the liquid sample held in a charged droplet trap, wherein the primary electrically charged droplet remains within the charged droplet trap for a selected residence time sufficient to provide partial evaporation of solvent, carrier liquid or both from the primary electrically charged droplet generating at least one secondary electrically charged droplet having said a selected size that exit the trap along an ion production axis at a selected release time.

34. The charged particle source of claim 1 comprising:

an aerodynamic ion lens system of selected length having an ion optical axis, an internal end and an external end, in fluid communication with the electrically charged droplet source and positioned at a selected distance downstream from the droplet trap, with respect to the flow of bath gas, for receiving the flow of bath gas and secondary electrically charged droplets having said selected size, wherein the optical axis of the lens system is coaxial with the ion production axis, wherein the secondary electrically charged droplets having said selected size, enter the internal end and at least partial evaporation of solvent, carrier liquid or both from the secondary electrically charged droplets having said a selected size in the aerodynamic ion lens system generate at least one gas phase ion, wherein the flow of bath gas through the lens system focuses the spatial distribution of the secondary electrically charged droplets having said selected size, gas phase ions or both about the ion production axis, wherein the secondary electrically charged droplets exit said external end of the aerodynamic ion lens system along said ion production axis and wherein said aerodynamic lens system is substantially free of electric fields generated from sources other than said electrically charged droplets and said gas phase ions.

35. The charged particle source of claim 34 wherein gas phase ions are generated in the aerodynamic ion lens system.

36. The charged particle source of claim 34 wherein the droplet production axis is orthogonal to the ion production axis.

37. The charged particle source of claim 34 wherein the droplet production axis is coaxial with the ion production axis.

38. An ion source for preparing gas phase ions from a liquid sample, containing chemical species in a solvent, carrier liquid or both, wherein the ions generated have a momentum substantially directed along an ion production axis, said source comprising:

a) an electrically charged droplet source for generating primary electrically charged droplets of the liquid sample in a flow of bath gas, wherein said primary electrically charged droplets have a selected droplet exit time and a momentum directed along a droplet production axis;

b) an aerodynamic ion lens system of selected length having an ion optical axis, an internal end and an external end, in fluid communication with the electrically charged droplet source and positioned at a selected distance downstream from the electrically charged droplet source with respect to the flow of bath gas, for receiving the flow of bath gas and the primary electrically charged droplets, wherein the optical axis of the lens system is coaxial with the ion production axis, wherein the primary electrically charged droplets enter the internal end and at least partial evaporation of solvent, carrier liquid or both from the primary electrically charged droplets in the aerodynamic ion lens system generates at least one gas phase ion; secondary electrically charged droplets or both wherein the flow of bath gas through the lens system focuses the spatial distribution of the primary electrically charged droplets, secondary electrically charged droplets, gas phase ions or any combinations of these about the ion production axis, wherein the secondary electrically charged droplets, gas phase ions or both exit said external end of the aerodynamic ion lens system having a momentum substantially directed along the ion production axis, and wherein said aerodynamic lens system is substantially free of electric fields generated from sources other than said electrically charged droplets and said gas phase ions; and c) at least one flow inlet, in fluid communication with said charged droplet source for introducing the flow of bath gas, wherein said flow of bath gas conducts said primary electrically charged droplets, secondary electrically charged droplets and gas phase ions through said aerodynamic ion lens system.

39. The ion source of claim 38 wherein the aerodynamic ion lens system comprises a plurality of apertures positioned at selected distances from the electrically charged droplet source along the ion production axis, wherein each aperture is concentrically positioned about the ion production axis.

40. The ion source of claim 39 wherein the apertures are substantially circular.

41. The ion source of claim 40 wherein the diameters of the plurality of apertures decrease sequentially from the internal end to the external end.

42. The ion source of claim 39 wherein the spacing between apertures is selectively adjustable.

43. The ion source of claim 39 wherein the spacing between apertures ranges from about 10 millimeter to about 100 millimeters.

44. The ion source of claim 40 wherein the aperture diameters range from about 1.0 millimeter to about 10 millimeters.

45. The ion source of claim 39 wherein the aperture width ranges from about 0.1 millimeter to 10 millimeters.

46. The ion source of claim 38 wherein the aerodynamic ion lens system comprises a thin plate orifice nozzle operationally connected to said external end.

47. The ion source of claim 38 wherein the flow of bath gas through said aerodynamic ion lens system is a laminar flow.

48. The ion source of claim 38 wherein the flow velocity of gas through the aerodynamic lens system ranges from about 100 m/sec. to about 500 m/sec.

49. The ion source of claim 38 wherein the aerodynamic lens system is differentially pumped.

50. The ion source of claim 49 wherein the pressure in the aerodynamic ion lens system ranges from about 5 Torr to about 0.01 Torr.

51. The ion source of claim 38 wherein the droplet production axis is coaxial with the ion production axis.

52. The ion source of claim 38 comprising a charge reduction region, of selected length, having a shielded reagent ion source which generates electrons, reagent ions or both from said bath gas, cooperatively connected to the electrically charged droplet source and positioned a selected distance downstream with respect to the flow of bath gas from said droplet source for receiving the flow of bath gas, electrically charged droplets, gas phase ions or any combinations of these, wherein at least partial evaporation of solvent, carrier liquid or both from the electrically charged droplets generates gas phase ions, wherein the electrons, reagent ions or both react with the electrically charged droplets, gas phase ions or both to reduce the charge state distribution of the gas phase ions and generate gas phase ions with a selected charge state distribution.

53. The ion source of claim 38 wherein the electrically charged droplet source comprises:

a) a piezoelectric element with an axial bore, positioned along the droplet production axis, having an internal end and an external end, wherein said piezoelectric element is capable of generating a pulsed pressure wave within the axial bore upon application of a pulsed electric potential to the piezoelectric element;

b) a dispenser element positioned within the axial bore of said piezoelectric element, wherein the dispenser element extends a selected distance past the external end of the axial bore and terminates at a dispensing end with a small aperture opening, wherein the dispenser element extends a selected distance past the internal end of the axial bore and terminates at an inlet end for introducing liquid sample and wherein said pulsed pressure wave is conveyed through said dispenser element and generates electrically charged droplets of the liquid sample that exit the dispensing end at a selected droplet exit time;

c) an electrode in contact with said liquid sample which is capable of holding said liquid sample at a selected electric potential;

d) a shield element positioned between said electrode and said piezoelectric element for substantially preventing the electric field, electromagnetic field or both generated from said electrode from interacting with said piezoelectric element; and e) a piezoelectric controller operationally connected to said piezoelectric element capable of adjusting the onset time, frequency, amplitude, rise time, fall time and duration of the pulsed electric potential applied to the piezoelectric element which selects the onset time, frequency, amplitude, rise time, fall time and duration of the pulsed pressure wave within the axial bore.

54. The ion source of claim 38 wherein the primary electrically charged droplets ions have substantially similar velocities.

55. The ion source of claim 38 wherein the primary electrically charged droplets and gas phase ions are positively charged.

56. The ion source of claim 38 wherein the primary electrically charged droplets and gas phase ions are negatively charged.

57. The ion source of claim 38 wherein the aerodynamic ion lens system comprises a flow rate controller operationally connected to said internal end to regulate the flow rate of bath gas, primary electrically charged droplets, secondary electrically charged droplet and gas phase ions through the aerodynamic ion lens system.

58. The ion source of claim 57 wherein the flow rate controller comprises a bleeder valve.

59. The ion source of claim 46 wherein the thin-plate-orifice nozzle comprises a cylindrical opening, about 6 mm in diameter and about 10 mm long, and a thin plate aperture about 3 mm in diameter.

60. The ion source of claim 38 wherein the charged droplet source is selected from the group consisting of:

a positive pressure electrospray source;

a pneumatic nebulizer;

a piezoelectric pneumatic nebulizer;

an atomizer;

a piezoelectric dispenser;

a nanospray source;

a pulsed nanospray source;

an ultrasonic nebulizer; and a cylindrical capacitor electrospray source.

61. The ion source of claim 38 wherein said chemical species are biopolymers.

62. The ion source of claim 38 wherein said chemical species are selected from the group consisting of:

one or more oligopeptides;

one or more oligonucleotides;

one or more lipids;

one or more glycoproteins;

one or more polysaccharides; and one or more carbohydrates.

63. The ion source of claim 38 comprising an online liquid phase separation device operationally connected to said electrically charged droplet source to provide sample purification, separation or both prior to formation of said primary electrically charged droplets.

64. The ion source of claim 63 wherein said online liquid phase separation device is selected from the group consisting of:

a high performance liquid chromatography device;

a capillary electrophoresis device;

a microfiltration device;

a flow sorting device;

a liquid phase chromatography device; and a super critical fluid chromatography device.

65. A device for determining the identity, concentration or both of chemical species in a liquid sample containing the chemical species in a solvent, carrier liquid or both, said device comprising:

a) an electrically charged droplet source for generating primary electrically charged droplets of the liquid sample in a flow of bath gas, wherein said primary electrically charged droplets have a selected droplet exit time and a momentum directed along a droplet production axis;

b) an aerodynamic ion lens system of selected length having an ion optical axis, an internal end and an external end, in fluid communication with the electrically charged droplet source and positioned at a selected distance downstream from the electrically charged droplet source with respect to the flow of bath gas, for receiving the flow of bath gas and the primary electrically charged droplets, wherein the optical axis of the lens system is coaxial with the ion production axis, wherein the primary electrically charged droplets enter the internal end and at least partial evaporation of solvent, carrier liquid or both from the primary electrically charged droplets in the aerodynamic ion lens system generates gas phase ions, secondary electrically charged droplets or both wherein the flow of bath gas through the lens system focuses the spatial distribution of the primary electrically charged droplets, secondary electrically charged droplets, gas phase ions or any combinations of these about the ion production axis, wherein the secondary electrically charged droplets, gas phase ions or both exit said external end of the aerodynamic ion lens system having a momentum substantially directed along the ion production axis, and wherein said aerodynamic lens system is substantially free of electric fields generated from sources other than said electrically charged droplets and said gas phase ions;

c) at least one flow inlet, in fluid communication with said charged droplet source for introducing the flow of bath gas, wherein said flow of bath gas conducts said primary electrically charged droplets, secondary electrically charged droplets and gas phase ions through said aerodynamic ion lens system; and d) a charged particle analyzer operationally connected to said aerodynamic ion lens system, for analyzing said gas phase ions.

66. The device of claim 65 wherein the charged particle analyzer comprises a mass analyzer operationally connected to the aerodynamic ion lens system to provide efficient introduction of said gas phase ions into said mass analyzer.

67. The device of claim 66 wherein said mass analyzer comprises a time-of-flight mass analyzer positioned along said ion production axis.

68. The device of claim 67 wherein said time-of-flight mass analyzer comprises an orthogonal time-of-flight mass spectrometer with a flight tube positioned orthogonal to said ion production axis.

69. The device of claim 1 wherein said time-of-flight mass analyzer comprises a linear time-of-flight mass spectrometer with a flight tube positioned coaxial with said ion production axis.

70. The device of claim 69 wherein said linear time-of-flight mass spectrometer employs delayed extraction techniques.

71. The device of claim 66 wherein the mass analyzer is selected from the group consisting of:

an ion trap;

a quadrupole mass spectrometer;

a magnetic sector mass analyzer;

a tandem mass spectrometer; and a residual gas analyzer.

72. The device of claim 66 comprising thin-plate-orifice nozzle positioned along the ion production axis and operationally connected to the external end of the aerodynamic lens system and the mass analyzer.

73. The device of claim 72 wherein the thin-plate-orifice nozzle comprises a cylindrical opening, about 6 mm in diameter and about 10 mm long, and a thin plate aperture about 3 mm in diameter.

74. The device of claim 65 wherein said charged particle analyzer comprises an instrument for determining electrophoretic mobility of said gas phase ions.

75. The device of claim 74 wherein said instrument for determining electrophoretic mobility comprises a differential mobility analyzer.

76. A device for determining the identity, concentration or both of chemical species in a liquid sample containing the chemical species in a solvent, carrier liquid or both, said device comprising:

a) an electrically charged droplet source for generating a primary electrically charged droplet of the liquid sample in a flow of bath gas, wherein said primary electrically charged droplet has a selected droplet exit time and a momentum substantially directed along a droplet production axis;

b) a charged droplet trap in fluid communication with the electrically charged droplet source and positioned along said droplet production axis at a selected distance downstream from said electrically charged droplet source, with respect to the flow of bath gas, for receiving the flow of bath gas and primary electrically charged droplet; wherein the primary electrically charged droplet remains in the charged droplet trap for a selected residence time sufficient to provide partial evaporation of solvent, carrier liquid or both from the primary electrically charged droplet generating at least one secondary electrically charged droplet having said selected size or a combination of at least one gas phase ion and at least one secondary electrically charged droplet having said a selected size; wherein the secondary electrically charged droplets having said selected size exit the trap along an ion production axis at a selected release time; and c) at least one flow inlet in fluid communication with said charged droplet source for introducing a flow of bath gas; and d) charge particle analyzer operationally connected to said charged droplet trap, for analyzing said gas phase ions generated from the secondary electrically charged droplets having a selected size.

77. The device of claim 76 wherein the charged particle analyzer comprises a mass analyzer operationally connected to the charged droplet trap to provide efficient introduction of said gas phase ions into said mass analyzer.

78. The device of claim 77 wherein said mass analyzer comprises a time-of-flight mass analyzer positioned along said ion production axis.

79. The device of claim 78 wherein said time-of-flight mass analyzer comprises an orthogonal time-of-flight mass spectrometer with a flight tube positioned orthogonal to said ion production axis.

80. The device of claim 78 wherein said time-of-flight mass analyzer comprises a linear time-of-flight mass spectrometer with a flight tube positioned coaxial with said ion production axis.

81. The device of claim 80 wherein said linear time-of-flight mass spectrometer employs delayed extraction techniques.

82. The device of claim 76 wherein the mass analyzer is selected from the group consisting of:

an ion trap;

a quadrupole mass spectrometer;

a magnetic sector mass analyzer;

a tandem mass spectrometer; and a residual gas analyzer.

83. The device of claim 76 wherein said charged particle analyzer comprises an instrument for determining electrophoretic mobility of said gas phase ions.

84. The device of claim 83 wherein said instrument for determining electrophoretic mobility comprises a differential mobility analyzer.

85. A device for determining the identity, concentration or both of chemical species in a liquid sample containing the chemical species in a solvent, carrier liquid or both, said device comprising:

a) an electrically charged droplet source for generating a primary electrically charged droplet of the liquid sample in a flow of bath gas, wherein said primary electrically charged droplet has a selected droplet exit time and a momentum substantially directed along a droplet production axis;

b) a charged droplet trap in fluid communication with the electrically charged droplet source and positioned along said droplet production axis at a selected distance downstream from said electrically charged droplet source, with respect to the flow of bath gas, for receiving the flow of bath gas and primary electrically charged droplet; wherein the primary electrically charged droplet remains in the charged droplet trap for a selected residence time sufficient to provide partial evaporation of solvent, carrier liquid or both from the electrically charged droplet generating at least one secondary electrically charged droplet having a selected size; wherein the secondary electrically charged droplets having said selected size exit the trap along an ion production axis at a selected release time;

c) an aerodynamic ion lens system of selected length having an ion optical axis, an internal end and an external end, in fluid communication with the electrically charged droplet source and positioned at a selected distance downstream from the droplet trap, with respect to the flow of bath gas, for receiving the flow of bath gas and secondary electrically charged droplets having said selected size, wherein the optical axis of the lens system is coaxial with the ion production axis, wherein the secondary electrically charged droplets having said selected size, enter the internal end and at least partial evaporation of solvent, carrier liquid or both from the secondary electrically charged droplets having said selected size in the aerodynamic ion lens system generates gas phase ions, wherein the flow of bath gas through the lens system focuses the spatial distribution of the secondary electrically charged droplets having said selected size, gas phase ions or both about the ion production axis, wherein the secondary electrically charged droplets, gas phase ions or both exit said external end of the aerodynamic ion lens system along said ion production axis, and wherein said aerodynamic lens system is substantially free of electric fields generated from sources other than said electrically charged droplets and said gas phase ions;

d) at least one flow inlet, in fluid communication with said charged droplet source for introducing the flow of bath gas; and e) a charge particle analyzer operationally connected to said aerodynamic ion lens system, for analyzing said gas phase ions.

86. The device of claim 85 wherein the charged particle analyzer comprises a mass analyzer operationally connected to the aerodynamic ion lens system to provide efficient introduction of said gas phase ions into said mass analyzer.

87. The device of claim 86 wherein said mass analyzer comprises a time-of-flight mass analyzer positioned along said ion production axis.

88. The device of claim 87 wherein said time-of-flight mass analyzer comprises an orthogonal time-of-flight mass spectrometer with a flight tube positioned orthogonal to said ion production axis.

89. The device of claim 87 wherein said time-of-flight mass analyzer comprises a linear time-of-flight mass spectrometer with a flight tube positioned coaxial with said ion production axis.

90. The device of claim 89 wherein said linear time-of-flight mass spectrometer employs delayed extraction techniques.

91. The device of claim 86 wherein the mass analyzer is selected from the group consisting of:

an ion trap;

a quadrupole mass spectrometer;

a magnetic sector mass analyzer;

a tandem mass spectrometer; and a residual gas analyzer.

92. The device of claim 86 comprising a thin-plate-orifice nozzle positioned along the ion production axis and operationally connected to the external end of the aerodynamic lens system and the mass analyzer.

93. The device of claim 92 wherein the thin-plate-orifice nozzle comprises a cylindrical opening, about 6 mm in diameter and about 10 mm long, and a thin plate aperture about 3 mm in diameter.

94. The device of claim 85 wherein said charged particle analyzer comprises an instrument for determining electrophoretic mobility of said gas phase ions.

95. The device of claim 94 wherein said instrument for determining electrophoretic mobility comprises a differential mobility analyzer.

96. A device for determining the identity, concentration or both of chemical species in a liquid sample containing the chemical species in a solvent, carrier liquid or both, said device comprising:

a) a primary electrically charged droplet of the liquid sample held in a charged droplet trap, wherein the primary electrically charged droplet remains within the charged droplet trap for a selected residence time sufficient to provide partial evaporation of solvent, carrier liquid or both from the primary electrically charged droplet generating at least one secondary electrically charged droplet having a selected size that exit the trap along an ion production axis at a selected release time; and b)charge particle analyzer operationally connected to said droplet trap, for analyzing said-gas phase ions generated from said electrically charged droplets having said selected size.

97. A method of generating charged particles from a liquid sample, containing chemical species in a solvent, carrier liquid or both, said method comprising the steps of:

a) providing a flow of bath gas;

b) generating a primary electrically charged droplet of the liquid sample in said flow of bath gas, wherein said primary electrically charged droplet exits a charged particle source at a selected droplet exit time having a momentum substantially directed along a droplet production axis:

c) directing said primary electrically charged droplet into a charged droplet trap in fluid communication with the electrically charged droplet source and positioned along said droplet production axis at a selected distance downstream from said electrically charged droplet source with respect to the flow of bath gas;

d) confining the primary electrically charged droplet in the charged droplet trap for a selected residence time sufficient to provide partial evaporation of solvent, carrier liquid or both from the primary electrically charged droplet thereby generating at least one secondary electrically charged droplet having a selected size;

d) releasing said secondary electrically charged droplet having said selected size, wherein said secondary electrically charged droplets exit the trap along an ion production axis at a selected release time.

98. A method of generating charged particles using the device of claim 33.

99. A method of generating gas phase ions from a liquid sample, containing chemical species in a solvent, carrier liquid or both said, method comprising the steps of:

a) providing a flow of bath gas;

b) generating a primary electrically charged droplet of the liquid sample in said flow of bath gas, wherein said primary electrically charged droplet exits a charged particle source at a selected droplet exit time having a momentum substantially directed along a droplet production axis;

c) directing said primary electrically charged droplet into a charged droplet trap in fluid communication with the electrically charged droplet source, wherein said charged droplet trap is positioned along said droplet production axis at a selected distance downstream from said electrically charged droplet source with respect to the flow of bath gas;

d) confining the primary electrically charged droplet in the charged droplet trap for a selected residence time sufficient to provide partial evaporation of solvent, carrier liquid or both from the primary electrically charged droplet thereby generating at least one secondary electrically charged droplet having a selected size;

d) releasing said secondary electrically charged droplet having said selected size, wherein said secondary electrically charged droplets exits the trap along an ion production axis at a selected release time;

e) directing said secondary electrically charged droplet and said flow of bath gas through an aerodynamic ion lens system of selected length having an ion optical axis, an internal end and an external end, wherein the optical axis of the lens system is coaxial with the ion production axis, wherein the secondary electrically charged droplet enters the internal end and at least partial evaporation of solvent, carrier liquid or both from the secondary electrically charged droplet in the aerodynamic ion lens system generates at least one gas phase ion, wherein the flow of bath gas through the lens system focuses the spatial distribution of the secondary electrically charged droplet, gas phase ion or both about the ion production axis, wherein the gas phase ion exit said external end of the aerodynamic ion lens system along said ion production axis and wherein said aerodynamic lens system is substantially free of electric fields generated from sources other than said electrically charged droplets and said gas phase ion.

100. A method of generating gas phase ions from a liquid sample, containing chemical species in a solvent, carrier liquid or both, said method comprising the steps of:

a) providing a flow of bath gas;

b) generating a primary electrically charged droplet of the liquid sample in said flow of bath gas, wherein said primary electrically charged droplet exits a charged particle source at a selected droplet exit time having a momentum substantially directed along a droplet production axis; and c) directing said primary electrically charged droplet and said flow of bath gas through an aerodynamic ion lens system of selected length having an ion optical axis, an internal end and an external end, wherein the ion optical axis of the lens system is coaxial with a ion production axis, wherein the primary electrically charged droplet enters the internal end and at least partial evaporation of solvent, carrier liquid or both from the primary electrically charged droplets in the aerodynamic ion lens system generates at least one gas phase ion, wherein the flow of bath gas through the lens system focuses the spatial distribution of the primary electrically charged droplet, gas phase ion or both about the ion production axis, wherein said gas phase ion exits said external end of the aerodynamic ion lens system having a momentum substantially directed along the ion production axis, and wherein said aerodynamic lens system is substantially free of electric fields generated from sources other than said electrically charged droplet and said gas phase ions.

101. A method of determining the identity and concentration of chemical species in a liquid sample containing chemical species in a solvent, carrier liquid or both, said method comprising the steps of:

a) providing a flow of bath gas;

b) generating a primary electrically charged droplet of the liquid sample in said flow of bath gas, wherein said primary electrically charged droplet exits a charged particle source at a selected droplet exit time having a momentum substantially directed along a droplet production axis;

c) directing said primary electrically charged droplet and said flow of bath gas through an aerodynamic ion lens system of selected length having an ion optical axis, an internal end and an external end, wherein the ion optical axis of the lens system is coaxial with a ion production axis, wherein the primary electrically charged droplet enters the internal end and at least partial evaporation of solvent, carrier liquid or both from the primary electrically charged droplets in the aerodynamic ion lens system generates at least one gas phase ion, wherein the flow of bath gas through the lens system focuses, the spatial distribution of the primary electrically charged droplet gas phase ion or both about the ion production axis wherein said gas phase ion exits said external end of the aerodynamic ion lens system having a momentum substantially directed along the ion production axis, and wherein said aerodynamic lens system is substantially free of electric fields generated from sources other than said electrically charged droplet and said gas phase ions; and analyzing said gas phase ion with a charged particle analyzer positioned along said ion production axis, thereby determining the identity and concentration of said chemical species.

102. A method of determining the identity and concentration of chemical species in a liquid sample containing chemical species in a solvent, carrier liquid or both, said method comprising the steps of:

a) providing a flow of bath gas;

b) generating a primary electrically charged droplet of the liquid sample in said flow of bath gas, wherein said primary electrically charged droplet exits a charged particle source at a selected droplet exit time having a momentum substantially directed along a droplet production axis;

c) directing said primary electrically charged droplet into a charged droplet trap in fluid communication with the electrically charged droplet source and positioned along said droplet production axis at a selected distance downstream from said electrically charged droplet source with respect to the flow of bath gas;

d) confining the primary electrically charged droplet in the charged droplet trap for a selected residence time sufficient to provide partial evaporation of solvent, carrier liquid or both from the primary electrically charged droplet thereby generating at least one secondary electrically charged droplet having a selected size;

d) releasing said secondary electrically charged droplet having said selected size, wherein said secondary electrically charged droplets exit the trap along an ion production axis at a selected release time;

e) at least partially evaporating said secondary electrically charged droplet having said selected size, thereby generating at least one gas phase ion;

analyzing said gas phase ion with a charged particle analyzer positioned along said ion production axis, thereby determining the identity and concentration of said chemical species.

103. A method of determining the identity and concentration of chemical species in a liquid sample containing chemical species in a solvent, carrier liquid or both, said method comprising the steps of:

a) providing a flow of bath gas;

b) generating a primary electrically charged droplet of the liquid sample in said flow of bath gas, wherein said primary electrically charged droplet exits a charged particle source at a selected droplet exit time having a momentum substantially directed along a droplet production axis;

c) directing said primary electrically charged droplet into a charged droplet trap in fluid communication with the electrically charged droplet source, wherein said charged droplet trap is positioned along said droplet production axis at a selected distance downstream from said electrically charged droplet source with respect to the flow of bath gas;

d) confining the primary electrically charged droplet in the charged droplet trap for a selected residence time sufficient to provide partial evaporation of solvent, carrier liquid or both from the primary electrically charged droplet thereby generating at least one secondary electrically charged droplet having a selected size;

d) releasing said secondary electrically charged droplet having said selected size, wherein said secondary electrically charged droplets exits the trap along an ion production axis at a selected release time;

e) directing said secondary electrically charged droplet and said flow of bath gas through an aerodynamic ion lens system of selected length having an ion optical axis, an internal end and an external end, wherein the optical axis of the lens system is coaxial with the ion production axis, wherein the secondary electrically charged droplet enters the internal end and at least partial evaporation of solvent, carrier liquid or both from the secondary electrically charged droplet in the aerodynamic ion lens system generates at least one gas phase ion, wherein the flow of bath gas through the lens system focuses the spatial distribution of the secondary electrically charged droplet, gas phase ion or both about the ion production axis, wherein the gas phase ion exit said external end of the aerodynamic ion lens system along said ion production axis and wherein said aerodynamic lens system is substantially free of electric fields generated from sources other than said electrically charged droplets and said gas phase ion; and analyzing said gas phase ion with a charged particle analyzer positioned along said ion production axis, thereby determining the identity and concentration of said chemical species.

104. A method of determining the identity and concentration of chemical species in a liquid sample containing chemical species in a solvent, carrier liquid or both using the device of claim 96.

* * * * *